(12) United States Patent
Watson et al.

(10) Patent No.: US 8,964,757 B2
(45) Date of Patent: Feb. 24, 2015

(54) HTTP OPTIMIZATION, MULTI-HOMING, MOBILITY AND PRIORITY

(75) Inventors: Mark Watson, San Francisco, CA (US); Lorenzo Vicisano, Barkeley, CA (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 12/965,698

(22) Filed: Dec. 10, 2010
(Under 37 CFR 1.47)

(65) Prior Publication Data
US 2011/0222404 A1      Sep. 15, 2011

Related U.S. Application Data

(60) Provisional application No. 61/288,119, filed on Dec. 18, 2009.

(51) Int. Cl.
*H04L 12/28* (2006.01)
*H04J 3/16* (2006.01)
(Continued)

(52) U.S. Cl.
CPC .............. *H04W 76/026* (2013.01); *H04L 47/14* (2013.01); *H04L 67/325* (2013.01); *H04L 69/14* (2013.01); *H04W 88/06* (2013.01)
USPC ........................ 370/395.21; 370/468; 709/229

(58) Field of Classification Search
CPC ....................................................... H04L 12/28
USPC ......... 370/229–236, 242, 244, 245, 250–253, 370/400, 395.21, 395.4, 328, 329; 709/203, 709/207, 220–222, 223–230, 232, 231, 709/200; 718/105
See application file for complete search history.

(56) References Cited

U.S. PATENT DOCUMENTS 7,359,985 B2 *   4/2008   Grove et al. ................... 709/238
7,409,454 B2 *   8/2008   Wynn et al. .................... 709/228
(Continued)

FOREIGN PATENT DOCUMENTS

CN       1379572 A       11/2002
CN       1842080 A       10/2006
(Continued)

OTHER PUBLICATIONS

Chang T Y, et al., "WebAccel: Accelerating Web access for low-bandwidth hosts", Computer Networks, Elsevier Science Publishers B.V., Amsterdam, NL, vol. 52, No. 11, Aug. 8, 2008, pp. 2129-2147, XP022734752, ISSN: 1389-1286, DOI:10.1016/J.COMNET.2008.02.007 [retrieved on Mar. 18, 2008].
(Continued)

*Primary Examiner* — Hanh N Nguyen
(74) *Attorney, Agent, or Firm* — Kristine U. Ekwueme

(57) ABSTRACT

Combining parallel Hypertext Transfer Protocol (HTTP) connections and pipelining overcomes an impact of increasing Round Trip Time (RTT) by varying in real time the number of parallel connections and pipelined requests such that the number of outstanding requests is minimal and the link remains fully utilized. Optimal construction and scheduling of requests and connections in an HTTP stack improves page load time and also provides for greater responsiveness to changes in object priorities. Multi-homing and mobility at the application layer for HTTP are addressed. Multi-homing provides for simultaneous use of multiple interfaces, for example WWAN and WLAN interfaces which improves download time, especially in the case that the available bandwidth the interfaces is of the same order of magnitude. Mobility provides for switching connections as the device moves. In combination they provide for smoother mobility. Mobility can be provided this way without server or network support.

34 Claims, 10 Drawing Sheets

(51) Int. Cl.
*G06F 15/16* (2006.01)
*H04W 76/02* (2009.01)
*H04L 12/801* (2013.01)
*H04L 29/08* (2006.01)
*H04L 29/06* (2006.01)
*H04W 88/06* (2009.01)

(56) References Cited

U.S. PATENT DOCUMENTS

| | | | |
|---|---|---|---|
| 7,653,634 B2 | 1/2010 | Mathur | |
| 7,657,618 B1* | 2/2010 | Rothstein et al. | 709/223 |
| 7,835,743 B2 | 11/2010 | Zhang et al. | |
| 2005/0027788 A1* | 2/2005 | Koopmans et al. | 709/200 |
| 2006/0031520 A1 | 2/2006 | Bedekar et al. | |
| 2006/0193295 A1 | 8/2006 | White et al. | |
| 2007/0116026 A1 | 5/2007 | Huang et al. | |
| 2007/0283079 A1 | 12/2007 | Iwamura et al. | |
| 2008/0114894 A1 | 5/2008 | Deshpande | |
| 2009/0022095 A1 | 1/2009 | Spaur et al. | |
| 2010/0091676 A1 | 4/2010 | Moran et al. | |
| 2010/0211626 A1* | 8/2010 | Li | 709/203 |
| 2011/0314129 A1 | 12/2011 | Rezaiifar et al. | |

FOREIGN PATENT DOCUMENTS

| | | |
|---|---|---|
| CN | 101006703 A | 7/2007 |
| CN | 101352006 A | 1/2009 |
| JP | 2004528764 T | 9/2004 |
| JP | 2005341310 A | 12/2005 |
| JP | 2007043678 A | 2/2007 |
| JP | 2007281731 A | 10/2007 |
| JP | 2009021966 A | 1/2009 |
| JP | 2009038653 A | 2/2009 |
| JP | 2009296084 A | 12/2009 |
| WO | 0013110 A1 | 3/2000 |
| WO | 02080452 A2 | 10/2002 |
| WO | 2006055784 A2 | 5/2006 |
| WO | 2007063585 A1 | 6/2007 |

OTHER PUBLICATIONS

International Search Report and Written Opinion—PCT/US2010/061360—ISA/EPO—Apr. 14, 2014.

International Search Report and Written Opinion—PCT/US2010/061362—ISA/EPO—Apr. 6, 2011.

Ishizu K, et al., "Design and Implementation of Cognitive Wireless Network based on IEEE P1900.4", Sensor, Mesh and Ad Hoc Communications and Networks Workshops, 2008. Secon Workshops '08. 5th IEEE Annual Communications Society Conference on, IEEE, Piscataway, NJ, USA, Jun. 16, 2008, pp. 1-8, XP031287470, ISBN: 978-1-4244-2562-4.

Kristian Evensen, et al., "A network-layer proxy for bandwidth aggregation and reduction of IP packet reordering", Local Computer Networks, 2009. LCN 2009.

IEEE 34th Conference on, IEEE, Piscataway. NJ, USA, Oct. 20, 2009, pp. 585-592, XP031581515, ISBN: 978-1-4244-4488-5.

Kyu-Han Kim, et al., "PRISM: Improving the Performance of Inverse-Multiplexed TCP in Wireless Networks", IEEE Transactions on Mobile Computing, IEEE Service Center, Los Alamitos, CA, US, vol. 6, No. 12, Dec. 1, 2007, pp. 1297-1312, XP011194987, ISSN: 1536-1233, DOI: DOI:10.1109/TMC.2007.70717 Sections 1, 2, 4 and 8.

Marisa Catalan, et al., "Web Optimization in Real UMTS Networks with Channel Switching Mechanisms", Vehicular Technology Conference, 2008. VTC Spring 2008, IEEE, IEEE, Piscataway, NJ, USA, May 11, 2008, pp. 2497-2501, XP031256014, ISBN: 978-1-4244-1644-8, Section III.

Pablo Rodriguez, et al., "Dynamic Parallel Access to Replicated Content in the Internet", IEEE / ACM Transactions on Networking, IEEE / ACM, New York, NY, US, vol. 10, No. 4, Aug. 1, 2002, XP011077181, ISSN: 1063-6692, Section III.

Spiro Philopoulos et al.,"Experimental Study of Parallel Downloading Schemes of Internet Mirror Sites", University of Manitoba Aug. 26, 2001, XP002629921, Retrieved from the Internet: URL:http://www.es.umanitoba.ca/lanrl/PUBS/342-164.ps [retrieved on Mar. 23, 2011].

Taiwan Search Report—TW099144798—TIPO—Aug. 18, 2013.

\* cited by examiner

HTTP OPTIMIZATION, MULTI-HOMING, MOBILITY AND PRIORITY

CLAIM OF PRIORITY UNDER 35 U.S.C. §119

The present application for patent claims priority to Provisional Application No. 61/288,119 entitled "HTTP Optimization, Multi-Homing, Mobility and Priority" filed Dec. 18, 2009, and assigned to the assignee hereof and hereby expressly incorporated by reference herein.

REFERENCE TO CO-PENDING APPLICATIONS FOR PATENT

The present application for patent is related to the following co-pending U.S. patent application Ser. No. 12/965,700 "BINDING/AGGREGATING MULTIPLE INTERFACES AT APPLICATION LAYER" by Ramin Rezaiifar, et al., filed concurrently herewith, assigned to the assignee hereof, and expressly incorporated by reference herein

BACKGROUND

1. Field

The present disclosure relates generally to communication, and more specifically to techniques for retrieving hypertext packet data content in a wireless communication network.

2. Background

Hypertext Transfer Protocol (HTTP) is the primary communication protocol used by web browsers and web applications. A large infrastructure has grown up within the Internet to support efficient operation of the HTTP protocol in the form of Content Delivery Networks. As a result an increasing number of applications are migrating to the HTTP protocol. While there are other reasons for this migration (e.g., Network Address Translation (NAT) and firewall traversal), it is the ability to leverage the massive scalability of the web infrastructure that is the main driver.

Web sites today are often extremely complex, comprising tens or hundreds of objects that must each be separately requested using HTTP. Various optimizations have been defined within HTTP to improve the speed with which the objects can be transported from server to client. A considerable amount of work has been done on application of these optimizations within wired networks; however it remains an unsolved problem to understand how these features behave and combine in the more challenging mobile environments with high Round Trip Time (RTT) and highly variable bandwidth. In particular it should be noted that much HTTP work was carried out some years ago at which time the characteristics of mobile networks differed considerably from today.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In one aspect, a method is provided for packet data communications by establishing a number of parallel connections for packet data communication, transmitting a plurality of pipelined requests via the number of parallel connections for retrieving a hypertext object comprised of packet data portions respectively stored on a plurality of servers, and dynamically varying the number of parallel connections and pipelined requests via the parallel connections to reduce outstanding requests while maintaining full link utilization.

In another aspect, at least one processor is provided for packet data communications. A first module establishes a number of parallel connections for packet data communication. A second module transmits a plurality of pipelined requests via the number of parallel connections for retrieving a hypertext object comprised of packet data portions respectively stored on a plurality of servers. A third module dynamically varies the number of parallel connections and pipelined requests via the parallel connections to reduce outstanding requests while maintaining full link utilization.

In an additional aspect, a computer program product is provided for packet data communications. A non-transitory computer-readable medium stores sets of code. A first set of codes causes a computer to establish a number of parallel connections for packet data communication. A second set of codes causes the computer to transmit a plurality of pipelined requests via the number of parallel connections for retrieving a hypertext object comprised of packet data portions respectively stored on a plurality of servers. A third set of codes causes the computer to dynamically vary the number of parallel connections and pipelined requests via the parallel connections to reduce outstanding requests while maintaining full link utilization.

In a further aspect, an apparatus is provided for packet data communications. The apparatus comprises means for establishing a number of parallel connections for packet data communication. The apparatus comprises means for transmitting a plurality of pipelined requests via the number of parallel connections for retrieving a hypertext object comprised of packet data portions respectively stored on a plurality of servers. The apparatus comprises means for dynamically varying the number of parallel connections and pipelined requests via the parallel connections to reduce outstanding requests while maintaining full link utilization.

In yet another aspect, an apparatus is provided for packet data communications. A transceiver establishes a number of parallel connections for packet data communication. The transceiver further transmits a plurality of pipelined requests via the number of parallel connections for retrieving a hypertext object comprised of packet data portions respectively stored on a plurality of servers. A computing platform dynamically varies the number of parallel connections and pipelined requests via the parallel connections to reduce outstanding requests while maintaining full link utilization.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Benefits exist in combining parallel HTTP connections and pipelining to overcome an impact of increasing Round Trip Time (RTT). Generally known browsers employ a fixed number of parallel connections and a fixed number of outstanding requests, albeit the number of parallel connections is influenced by the set of distinct servers that must be contacted.

One aspect of the present innovation is to vary in real time the number of parallel connections and pipelined requests such that the number of outstanding requests is minimal and the link remains fully utilized.

For instance, these numbers can be varied to ensure that the link remains fully utilized based upon the amount of data requested; however, the amount of not yet received data must not exceed the product of the bandwidth and the RTT. Both of these quantities are continuously varying. In addition, the amount of outstanding data is not known exactly because object sizes are not known until the header of the object arrives.

One possibility is to construct a probability model for all these variables and attempt to keep the overall probability of the link becoming idle below some threshold. For example a probability model for object sizes might use historical data that maps object type (image, HTML, JavaScript, CSS, etc.) to a distribution on the object size. Especially if there is a previous cached version of the object then the data that will be returned is either zero (or rather just the HTTP headers) because the object has not changed, or a new version which is likely to have similar size to the old one.

Thus, based on recently measured bandwidth and round trip time, more objects can continue to be pipelined until the probability that the requested but not received data exceeds the bandwidth RTT product. This computation can be repeated whenever more data arrives or changes in the bandwidth or round trip time are observed. Thereby, a target number of pipelined requests on an HTTP connection can vary during the lifetime of the connection as described in greater detail below.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
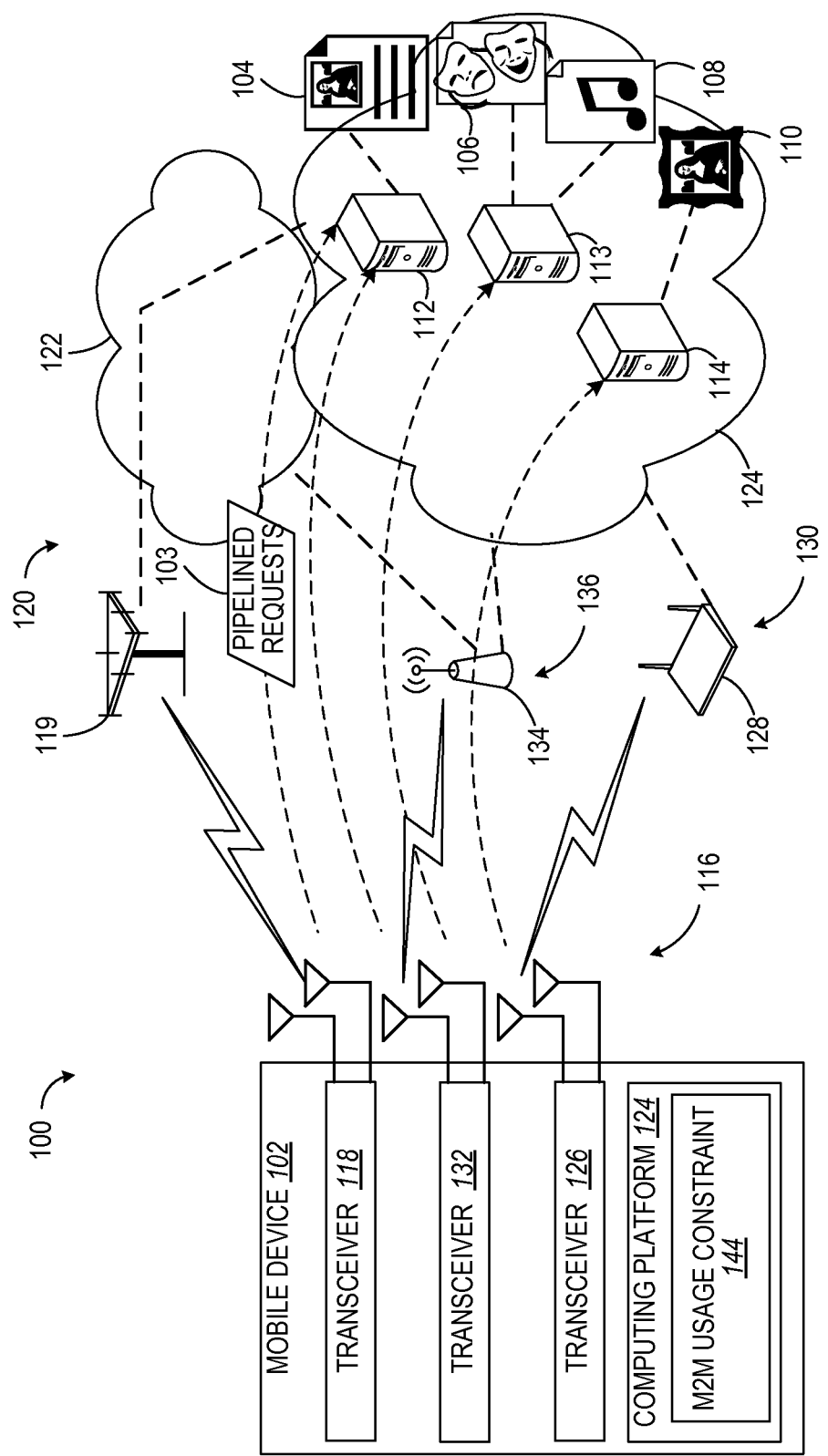
FIG. 1 illustrates a schematic diagram of a communication system for HTTP optimization.

In FIG. 1, in a communication system 100, a mobile device, access terminal, or User Equipment (UE) 102 makes pipelined requests 103 for hypertext content 104 containing objects 106, 108, 110 stored on a plurality of servers 112-114. In an exemplary aspect, mobile device 102 gains access via an airlink 116 that aggravates a Round Trip Time (RTT) required to receive the objects 106-110 and thus to render the hypertext content 104. In one aspect, the mobile device 102 has a radio transceiver 118 for communicating with a node (e.g., macrocell, femtocell, relay) 119 that serves as part of a Wireless Wide Area Network (WWAN) 120 to an Internet Protocol Multimedia Subsystem (IMS) 122 to the servers 112-114 hosted in a Core Network (CN) (e.g., Internet) 124.

Alternatively or in addition, the mobile device 102 has a transceiver 126 for communicating with a node 128 that serves a Wireless Local Access Network (WLAN) 130 for accessing the servers 112-114 via CN 124.

Alternatively or in addition, the mobile device 102 has a transceiver 132 for communicating with a node 134 that serves a Personal Access Network (PAN) 136 and is coupled to either the WWAN 120 as depicted at 138 or the WLAN 130 as depicted at 140 for reaching the servers 112-114 via CN 124.

In one aspect, the transceiver(s) 118, 126, 132 establish a number of parallel connections for packet data communication. The transceiver(s) 118, 126, 132 further transmit a plurality of pipelined requests via the number of parallel connections for retrieving a hypertext object comprised of packet data portions respectively stored on a plurality of servers.

A computing system 124 of the mobile device 102 has an HTTP optimization component 144 dynamically varies the number of parallel connections and pipelined requests via the parallel connections to reduce outstanding requests while maintaining full link utilization.

Figure 2A:
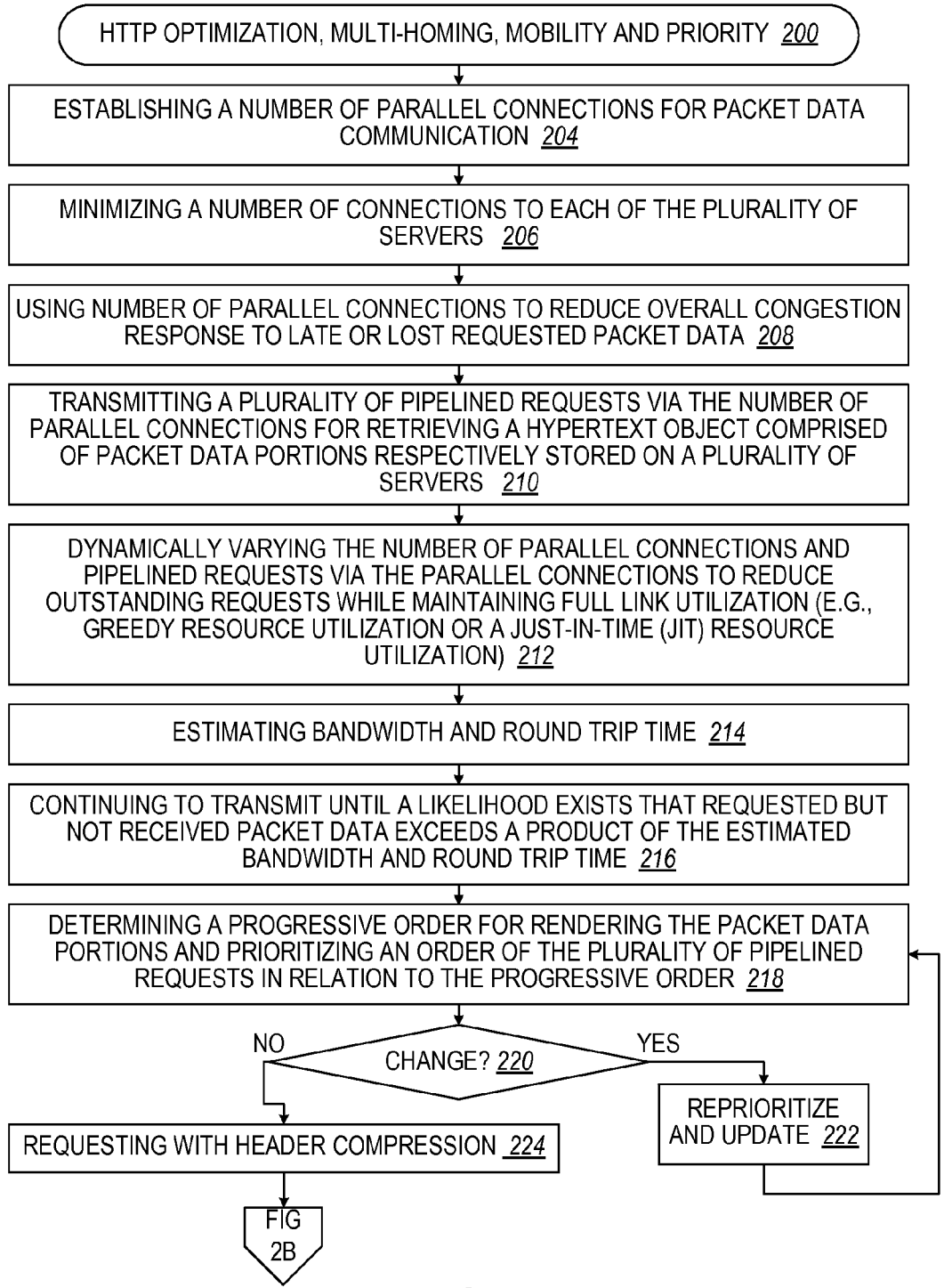
FIGS. 2A-2B illustrate a flow diagram for a methodology for HTTP optimization.
Figure 2B:
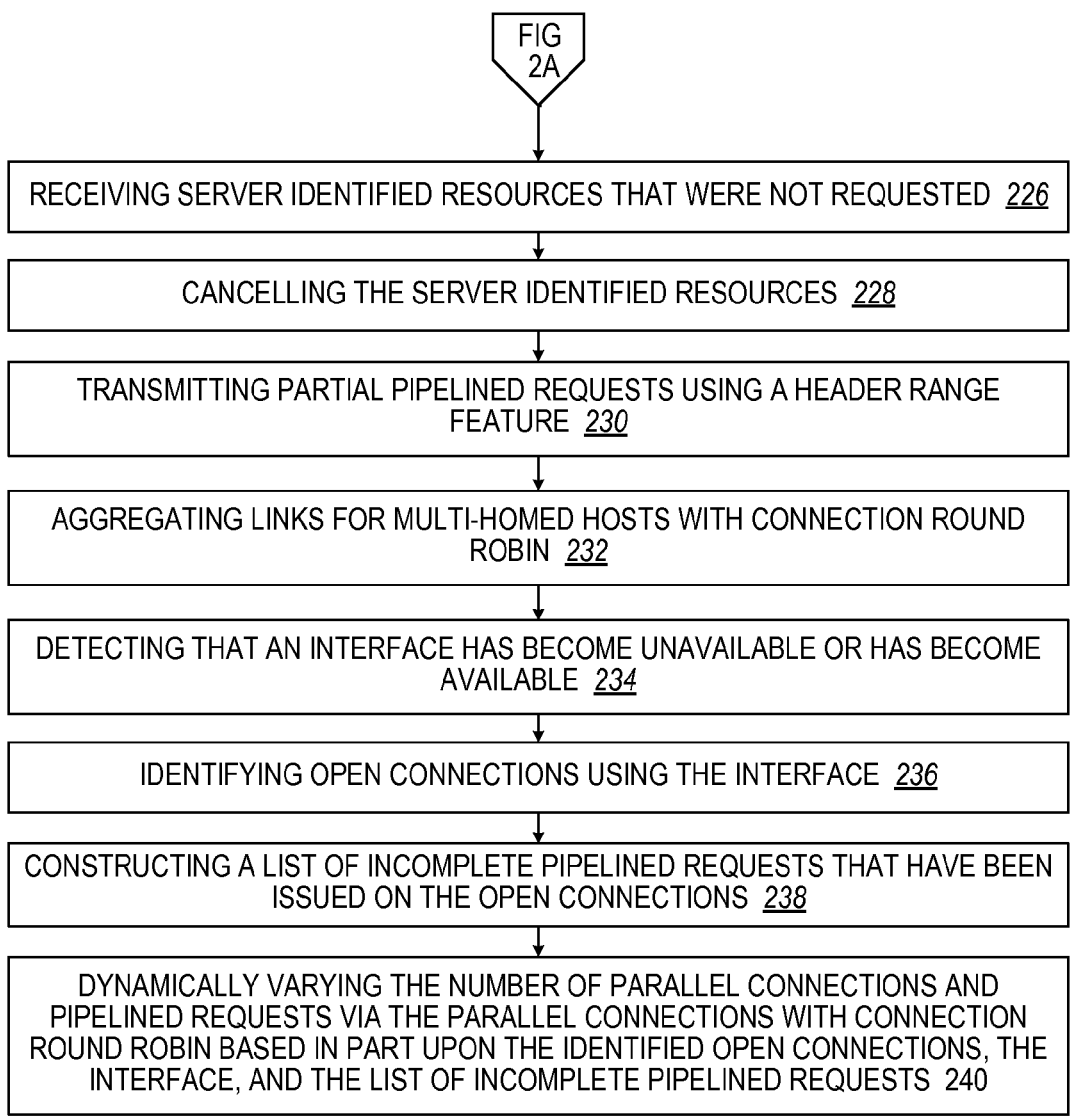

In FIG. 2 (FIG. 2A and FIG. 2B), an exemplary methodology 200 or sequence of operations is depicted for HTTP optimization, multi-homing, mobility and priority. Block 204 depicts establishing a number of parallel connections for packet data communication. In a particular aspect, establishing the number of parallel connections is accomplished by minimizing a number of connections to each of the plurality of servers (block 206). The number of parallel connections is used to reduce overall congestion response to late or lost requested packet data (block 208).

A plurality of pipelined requests is transmitted via the number of parallel connections for retrieving a hypertext object comprised of packet data portions respectively stored on a plurality of servers (block 210).

The number of parallel connections are dynamically varied for transmitting additional pipelined requests via the parallel connections to reduce outstanding requests, while maintaining full link utilization (block 212). For example, full link utilization can entail a greedy resource utilization or a Just-in-Time (JiT) resource utilization.

In an exemplary aspect, this dynamic variation is achieved by estimating bandwidth and round trip time (block 214). Pipelined requests continue to be transmitted until a likelihood exists that requested but not received packet data exceeds a product of the estimated bandwidth and round trip time (block 216).

In an exemplary aspect, one or more further optimizations are included, especially if supported by a network that facilitates HTTP retrieval.

For example, a progressive ordering is determined for rendering the packet data portions and an order of the plurality of pipelined requests is prioritized in relation to the progressive ordering (block 218). If a change occurs during retrieval (block 220), then the progressive ordering is reprioritized and the process is updated (block 222).

For another example, the plurality of pipelined requests are requested with header compression (block 224).

For an additional example, the network can identify (anticipate) what additional resources may be required by the mobile device. In such a case, server identified resources that were not requested can be received (block 226). If not needed, responding by cancelling the server identified resources can avoid unnecessary consuming over-the-air resources (block 228).

For a further example, the plurality of pipelined requests can be transmitted as a plurality of partial pipelined requests using a header range feature (block 230).

For yet another example, the plurality of pipelined requests can be transmitted by aggregating links for multi-homed hosts with connection round robin (block 232). Mobility in light of this multi-homing capability can be addressed then by detecting that an interface has become unavailable or has become available (block 234), identifying open connections using the interface (block 236), constructing a list of incomplete pipelined requests that have been issued on the open connections (block 238), and dynamically varying the number of parallel connections and pipelined requests via the parallel connections with connection round robin based in part upon the identified open connections, the interface, and the list of incomplete pipelined requests (block 240).

In an exemplary aspect, the mobile device can maintain a separate Domain Name Service (DNS) cache for each interface and can use network proxies, statically defined routes and Proxy Auto Configuration (PAC) scripts in an absence of operating system and web browser support.

Figure 3:
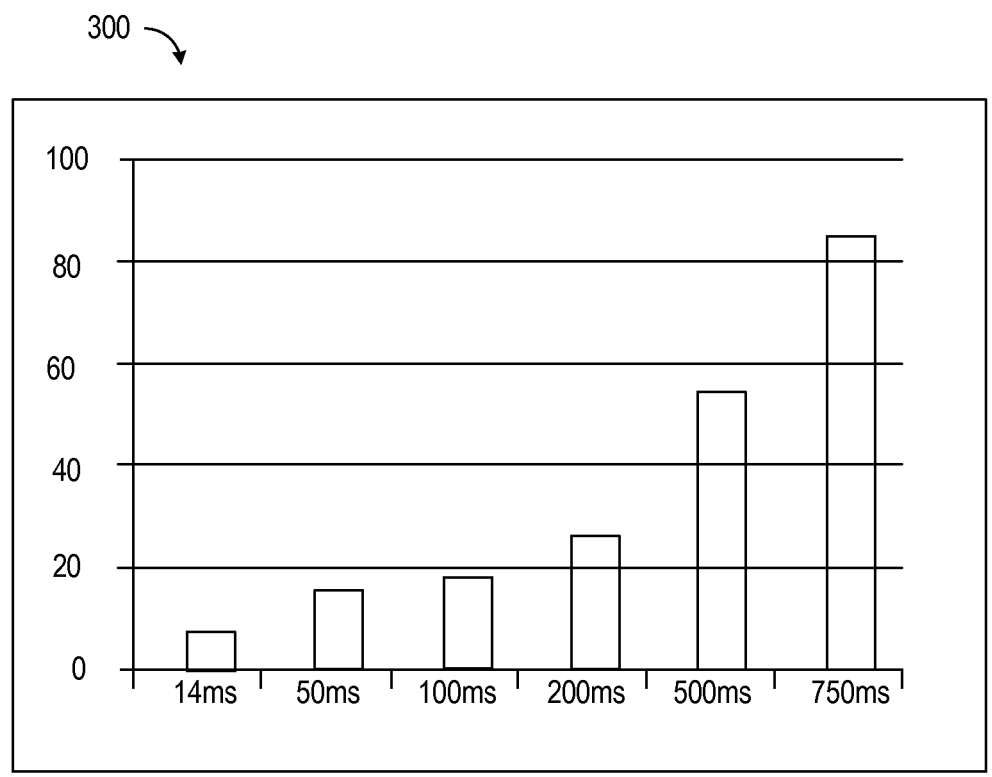
FIG. 3 illustrates a graphical plot of page load time as a function of round trip time (RTT).

FIG. 3 illustrates in a graphical plot 300 the effect of longer RTT on page load time (in seconds) using the Firefox web browser with parallel connections and pipelining enabled for nytimes.com. The page tested consists of around one hundred (100) objects totaling approximately 1.3 MB of data. The test was carried out over a fixed bandwidth 1.5 MBit/s link and repeated with different amounts of additional delay to simulate higher RTT links. With full link utilization, the page should take about seven (7) seconds to download and indeed this is what is achieved with very low Round Trip Time as might be observed on wired networks. However, clearly the link utilization falls dramatically in inverse proportion to the RTT as the RTT increases.

This experiment demonstrates that even a state-of-the-art web browser is unable to fully utilize a link of modest bandwidth if the RTT is larger than typically found on wired networks. Additionally, the resulting increased page load times are well within the region where user experience is impacted (in that a 200% increase in page load time from 7s to 21s is very noticeable whereas a 200% increase from 100 ms to 300 ms might not be).

Link utilization as used herein refers to the ability of the client to utilize all the resources that the network is prepared to give. In an EV-DO or HSPA scenario, when one user "underutilizes" the link in this sense, the unused capacity is given to other users so there is no underutilization of radio resources as a whole. Poor link utilization in our sense does result, though, in poor user experience as observed in the longer page load times.

As a concrete example, if ten (10) users each request a 1 MB file (not necessarily all at the same time) and the network have a shared capacity of 8 MBit/s, then it will take 10 s to deliver the data to all of the users. It is better, in terms of average wait time, to serve the data "sequentially", taking 1s for each user, than to deliver to all the users in "parallel" taking as much as 10s for each user.

Various techniques available in HTTP can be used to optimize object delivery:

Persistent connections: The HTTP 1.0 specification required a new Transport Control Protocol (TCP) connection to be established for each HTTP request. Since each TCP connection establishment implies a SYN/ACK (Synchronize/Acknowledge) exchange and a period of slow transmission due to the slow-start phase of TCP congestion control, this requirement exacted a heavy price in terms of object delivery time.

HTTP1.1 introduced persistent connections to better support the case in which multiple requests are issued to the same server. In this case the TCP connection is reused by sending a new HTTP request on the same connection after receipt of the previous response has completed. In this approach the downlink is idle for the time between the sending of the request and the receipt of the first packet of the response (one Round Trip Time).

Figure 4:
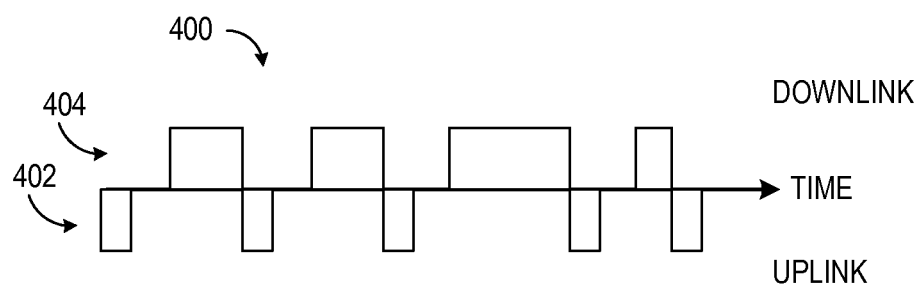
FIG. 4 illustrates a diagram of a link usage pattern for a single persistent connection.

A link usage pattern 400 for a single persistent connection can be seen from FIG. 4, where the gaps between the uplink requests 402 and the downlink responses 404 indicate an underutilization of the link (in the form of the gaps) and the fact that this underutilization is worse if the RTT is higher.

It should be appreciated with the benefit of the present disclosure that simply increasing the link bandwidth, without addressing RTT, does not in itself improve performance in terms of link utilization. With further reference to FIG. 4, increasing the bandwidth would make each uplink and downlink block narrower as a function of time (i.e., same data transferred in less time), but would not reduce the size of the gaps. In fact the gaps would represent a greater fraction of the total download time, thus increasing bandwidth reduces link utilization in this case!

Parallel connections: Modern browsers open multiple TCP connections in parallel either to the same or different servers (or both). The effect of this technique is twofold: Firstly, the congestion control behavior of an aggregate of multiple actively transmitting TCP connections can be thought of as equivalent to a single TCP connection but with a much faster opening of the congestion window during slow-start and with a much reduced congestion response to each packet drop. Secondly, in the case that transmission on one connection is intermittent (as illustrated above for persistent connections), the idle periods between transmissions may be used by other connections, thereby improving link utilization.

Pipelining: HTTP1.1 in fact allows multiple requests to be sent without waiting for the completion of the response to the first request. This enables the server to send responses back-to-back, without the link becoming idle between responses. Responses must be sent in the same order as the requests were received as HTTP provides no other mechanism to match requests and responses.

Figure 5:
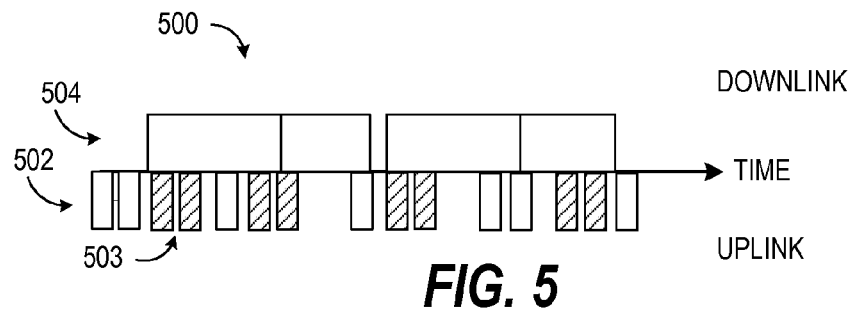
FIG. 5 illustrates a diagram of a link usage pattern for first and second uplink requests and a downlink response.

The effect of pipelining is illustrated in FIG. 5 for a link usage pattern 500 for a persistent connection with first and second uplink requests 502, 503 and the downlink responses 504.

Modern web browsers all make substantial use of the first two techniques above. However, support of pipelining, while mandated in the HTTP1.1 specification, was not universal at servers and proxies for some time and there is some evidence of peculiar failure modes especially in the case of transparent proxies. As a result, some care is needed in the implementation of pipelining, for example taking care to detect failure modes and fallback gracefully to non-pipelining operation and by keeping white lists of servers where the technique has been successful. The Opera browser has pipelining enabled by default (and apparently implements such techniques). Pipelining is supported in Firefox, but disabled by default. Safari and Chrome do not (currently) support pipelining.

The reason for the absence of wide support for pipelining in browsers is clear from FIG. 3 and the problems referred to above: browser utilization of the link is very high on low RTT connections through the use of persistent and parallel connections alone. Content Delivery Networks have aggressively pushed down typical web RTTs in recent years resulting in improved browsing performing (this being a primary value proposition of CDNs) and as a result for the majority of wired and Wireless Local Access Network (WLAN) web browsing, there is little perceived problem.

One might expect that where pipelining is supported, link utilization should be 100% with a single connection as there should be no gap between responses. However, in some cases while servers may accept requests in pipelined form they may not process each request until the previous one has completed. This leads to a gap between responses equal to the time taken for server processing. This time may be significant if the server is heavily loaded, has to perform complex functions such as script execution to generate the response and/or has to refer to external servers (e.g. databases).

The same effect may be observed if there are intermediate proxies that accept pipelined requests on the incoming side but issue serial requests on the outgoing side. Even where servers process pipelined requests in parallel, the results of this processing may not be available when the time to send a given response arrives.

Initial experiments: The above data leads us to believe there is scope for improvement in web browsing performance on high RTT links, such as Wireless Wide Area Network (WWAN). Further evidence comes from applying pipelining between the client and an intermediate proxy and additionally introducing the possibility to return responses out-of-order (i.e., through a new HTTP extension supported by client and proxy). In this approach link utilization is improved because the low RTT between client and proxy allows a single TCP connection to fully utilize the WWAN link and the proxy is designed to issue parallel requests on the outgoing side. Early identification of required resources can also be incorporated.

It should be noted that the HTTP extension for out-of-order responses may provide benefits if supported directly by the target HTTP servers (and assuming those servers process requests in parallel). It is believed that experiments have not pursued this approach, except to the extent described below for Google SPDY.

Experiments performed in furtherance of the present innovation address the case in which no proxy deployment is required (i.e., client-side-only techniques). For clarity, the initial focus is on an "ideal browser" in which all bottlenecks except networking have been eliminated. Specifically, the "ideal browser":

has a priori knowledge of the complete set of requests that are required to render a page; and renders content instantly as received.

The only contribution to page load time is therefore the time required to transfer the data over the network, using the HTTP protocol. The "ideal browser" is implemented as a Python script which is supplied in advance with a list of objects (taken from a trace of a real web page download) and which implements an algorithm using HTTP persistent connections, parallel connections and pipelining to download the objects. The time taken to download all the objects is measured.

In order to better understand the interaction between parallel connections, pipelining and network bandwidth and RTT, experiments were conducted with between one (1) and ten (10) parallel connections and between one (1) and ten (10) outstanding requests on each. (One (1) outstanding request corresponds to the standard non-pipelining approach, 'n' outstanding requests implies that initially 'n' requests are sent and subsequently a new request is sent each time a response is completely received).

The results for different network bandwidths and RTTs are shown in TABLES 1-6. In particular, the performance of different configurations of multiple connections and pipelining on real web server traces are idealized. The web request trace is collected from popular web sites using Wireshark. Then the dump file is processed to generate a request trace file. For initial experiments all requests are assumed to be known upfront and executed in order. Objects are only requested from the primary server, i.e., the server with a disproportionate share of objects comprising the website in question. The primary server phenomenon is also characterized for popular websites.

TABLE 1 below shows the average download time observed for each configuration of multiple connections and pipelining:

TABLE 1

Measurements with No Added Delay.
MAXIMUM OUTSTANDING REQUESTS PER TCP CONNECTION

| | | 1 | 2 | 3 | 4 | 5 | 6 | 7 | 8 | 9 | 10 |
|---|---|---|---|---|---|---|---|---|---|---|---|
| NUMBER OF | 1 | 6.0 | 5.9 | 5.9 | 5.3 | 5.7 | 5.3 | 5.3 | 5.3 | 5.3 | 5.2 |
| PARALLEL TCP | 2 | 5.4 | 5.6 | 5.7 | 5.2 | 5.4 | 5.3 | 5.3 | 5.4 | 5.4 | 5.3 |
| CONNECTIONS | 3 | 5.3 | 5.4 | 5.3 | 5.3 | 5.2 | 5.5 | 5.3 | 5.2 | 5.2 | 5.4 |
| | 4 | 5.3 | 5.3 | 5.3 | 5.3 | 5.4 | 5.2 | 5.2 | 5.3 | 5.3 | 5.2 |
| | 5 | 5.5 | 5.3 | 5.3 | 5.3 | 5.3 | 5.3 | 5.2 | 5.3 | 5.2 | 5.3 |
| | 6 | 5.3 | 5.3 | 5.4 | 5.4 | 5.3 | 5.5 | 5.2 | 5.3 | 5.3 | 5.3 |
| | 7 | 5.3 | 5.5 | 5.3 | 5.3 | 5.3 | 5.3 | 5.3 | 5.3 | 5.3 | 5.3 |
| | 8 | 5.5 | 5.3 | 5.3 | 5.3 | 5.3 | 5.3 | 5.5 | 5.3 | 5.3 | 5.3 |
| | 9 | 5.3 | 5.3 | 5.8 | 5.3 | 5.3 | 5.3 | 5.3 | 5.3 | 5.3 | 5.3 |
| | 10 | 5.5 | 5.3 | 5.3 | 5.3 | 5.3 | 5.3 | 5.5 | 5.3 | 5.3 | 5.3 |

TABLES 2-7 below show the average download time observed for each configuration of multiple connections and pipelining:

TABLE 2

Measurements with 50 ms RTT
MAXIMUM OUTSTANDING REQUESTS PER TCP CONNECTION

| | | 1 | 2 | 3 | 4 | 5 | 6 | 7 | 8 | 9 | 10 |
|---|---|---|---|---|---|---|---|---|---|---|---|
| NUMBER OF | 1 | 9.3 | 8.0 | 6.5 | 6.3 | 5.7 | 5.7 | 5.9 | 5.5 | 5.4 | 5.6 |
| PARALLEL TCP | 2 | 6.2 | 6.1 | 5.7 | 5.4 | 5.4 | 5.4 | 5.4 | 5.4 | 5.5 | 5.4 |
| CONNECTIONS | 3 | 5.6 | 5.5 | 5.4 | 5.4 | 5.4 | 5.4 | 5.4 | 5.4 | 5.4 | 5.5 |
| | 4 | 5.5 | 5.5 | 5.5 | 5.4 | 5.6 | 5.4 | 5.5 | 5.4 | 5.4 | 5.3 |
| | 5 | 5.6 | 5.4 | 5.4 | 5.4 | 5.4 | 5.4 | 5.4 | 5.4 | 5.4 | 5.4 |
| | 6 | 5.4 | 5.4 | 5.5 | 5.4 | 5.4 | 5.4 | 5.4 | 5.4 | 5.4 | 5.5 |
| | 7 | 5.4 | 5.6 | 5.4 | 5.4 | 5.4 | 5.4 | 5.3 | 5.4 | 5.3 | 5.4 |
| | 8 | 5.4 | 5.5 | 5.6 | 5.4 | 5.4 | 5.4 | 5.4 | 5.4 | 5.5 | 5.4 |
| | 9 | 5.4 | 5.4 | 5.4 | 5.4 | 5.5 | 5.4 | 5.9 | 5.4 | 5.4 | 5.6 |
| | 10 | 5.4 | 5.4 | 5.4 | 5.4 | 5.4 | 5.4 | 5.4 | 5.4 | 5.4 | 5.4 |

TABLE 3

Measurements with 100 ms RTT
MAXIMUM OUTSTANDING REQUESTS PER TCP CONNECTION

|  |  | 1 | 2 | 3 | 4 | 5 | 6 | 7 | 8 | 9 | 10 |
|---|---|---|---|---|---|---|---|---|---|---|---|
| NUMBER OF | 1 | 16.5 | 12.9 | 9.5 | 8.0 | 6.9 | 6.6 | 6.3 | 6.1 | 5.9 | 5.7 |
| PARALLEL TCP | 2 | 8.8 | 7.8 | 6.4 | 6.0 | 5.7 | 5.7 | 5.7 | 5.7 | 5.6 | 5.6 |
| CONNECTIONS | 3 | 6.7 | 6.3 | 5.8 | 5.7 | 5.8 | 5.6 | 5.6 | 6.0 | 5.6 | 5.6 |
|  | 4 | 6.3 | 5.9 | 5.6 | 5.6 | 5.6 | 5.6 | 5.6 | 5.6 | 5.6 | 5.5 |
|  | 5 | 5.8 | 5.7 | 5.6 | 5.6 | 5.8 | 5.6 | 5.6 | 5.6 | 5.6 | 5.5 |
|  | 6 | 5.7 | 5.9 | 5.7 | 5.6 | 5.5 | 5.5 | 5.5 | 5.5 | 5.5 | 5.5 |
|  | 7 | 5.6 | 5.6 | 5.6 | 5.6 | 5.5 | 5.7 | 5.8 | 5.5 | 5.6 | 5.5 |
|  | 8 | 5.6 | 5.6 | 5.5 | 5.5 | 5.5 | 5.5 | 5.5 | 5.5 | 5.5 | 5.5 |
|  | 9 | 5.6 | 5.5 | 5.5 | 5.5 | 5.5 | 5.5 | 5.5 | 5.5 | 5.5 | 5.5 |
|  | 10 | 5.6 | 5.5 | 5.5 | 5.7 | 5.7 | 6.2 | 5.8 | 5.8 | 5.7 | 5.5 |

TABLE 4

Measurements with 200 ms RTT
MAXIMUM OUTSTANDING REQUESTS PER TCP CONNECTION

|  |  | 1 | 2 | 3 | 4 | 5 | 6 | 7 | 8 | 9 | 10 |
|---|---|---|---|---|---|---|---|---|---|---|---|
| NUMBER OF | 1 | 31.7 | 24.3 | 17.0 | 14.1 | 11.7 | 10.1 | 9.2 | 8.2 | 7.9 | 7.4 |
| PARALLEL TCP | 2 | 15.2 | 12.6 | 9.3 | 8.1 | 7.5 | 6.8 | 6.6 | 6.5 | 6.5 | 6.3 |
| CONNECTIONS | 3 | 10.9 | 9.2 | 7.5 | 6.8 | 6.4 | 6.3 | 6.2 | 6.3 | 6.2 | 6.0 |
|  | 4 | 8.7 | 7.7 | 6.6 | 6.3 | 6.3 | 6.3 | 6.2 | 6.2 | 6.1 | 6.2 |
|  | 5 | 7.5 | 7.0 | 6.4 | 6.1 | 6.1 | 6.0 | 6.1 | 6.1 | 6.0 | 5.9 |
|  | 6 | 6.9 | 6.4 | 6.3 | 6.0 | 6.0 | 6.2 | 6.0 | 6.0 | 6.0 | 5.9 |
|  | 7 | 6.7 | 6.6 | 6.3 | 6.5 | 6.3 | 6.1 | 6.1 | 6.1 | 6.4 | 6.2 |
|  | 8 | 6.7 | 6.4 | 6.3 | 6.0 | 6.2 | 5.9 | 6.1 | 6.1 | 6.2 | 6.1 |
|  | 9 | 6.4 | 6.1 | 6.1 | 6.1 | 6.1 | 6.0 | 6.1 | 6.0 | 5.9 | 6.2 |
|  | 10 | 6.5 | 6.1 | 6.0 | 6.2 | 6.3 | 6.1 | 6.2 | 6.0 | 6.1 | 5.8 |

TABLE 5

Measurements with 500 ms RTT.
MAXIMUM OUTSTANDING REQUESTS PER TCP CONNECTION

|  |  | 1 | 2 | 3 | 4 | 5 | 6 | 7 | 8 | 9 | 10 |
|---|---|---|---|---|---|---|---|---|---|---|---|
| NUMBER OF | 1 | 74.8 | 60.0 | 45.5 | 34.8 | 29.1 | 22.9 | 20.2 | 18.3 | 15.5 | 17.0 |
| PARALLEL TCP | 2 | 37.6 | 31.1 | 20.9 | 17.5 | 15.4 | 14.1 | 11.9 | 12.2 | 12.8 | 10.9 |
| CONNECTIONS | 3 | 25.3 | 21.3 | 16.6 | 13.7 | 12.4 | 11.9 | 9.2 | 10.0 | 8.9 | 8.6 |
|  | 4 | 20.1 | 17.3 | 12.8 | 10.4 | 10.7 | 9.8 | 9.3 | 8.9 | 8.9 | 7.9 |
|  | 5 | 17.1 | 14.4 | 11.7 | 9.6 | 8.8 | 8.1 | 8.2 | 8.0 | 8.6 | 7.7 |
|  | 6 | 14.5 | 12.2 | 9.8 | 9.3 | 8.9 | 8.8 | 8.1 | 8.3 | 8.3 | 8.5 |
|  | 7 | 14.1 | 11.7 | 9.3 | 8.6 | 8.1 | 7.6 | 7.8 | 8.4 | 8.5 | 7.7 |
|  | 8 | 13.1 | 11.8 | 9.6 | 10.0 | 8.0 | 8.8 | 9.1 | 8.5 | 8.0 | 8.0 |
|  | 9 | 11.6 | 11.4 | 8.4 | 7.9 | 7.6 | 8.4 | 8.1 | 8.9 | 7.5 | 7.6 |
|  | 10 | 10.8 | 9.3 | 9.7 | 8.8 | 8.4 | 7.9 | 8.9 | 9.4 | 9.2 | 9.4 |

TABLE 6

Measurements with 3G EVDO.
MAXIMUM OUTSTANDING REQUESTS PER TCP CONNECTION

|  |  | 1 | 2 | 3 | 4 | 5 | 6 | 7 | 8 | 9 | 10 |
|---|---|---|---|---|---|---|---|---|---|---|---|
| NUMBER OF | 1 | 22.5 | 16.5 | 12.6 | 11.1 | 9.1 | 8.7 | 7.3 | 7.6 | 8.1 | 6.9 |
| PARALLEL TCP | 2 | 11.2 | 9.4 | 7.6 | 6.6 | 6.1 | 6.0 | 5.6 | 5.4 | 5.2 | 5.3 |
| CONNECTIONS | 3 | 8.3 | 6.9 | 5.9 | 5.4 | 5.8 | 5.1 | 5.1 | 5.0 | 5.1 | 4.9 |
|  | 4 | 7.1 | 6.4 | 5.3 | 5.2 | 5.1 | 4.7 | 4.7 | 4.7 | 5.0 | 4.9 |
|  | 5 | 6.4 | 5.4 | 4.9 | 4.7 | 4.6 | 4.7 | 4.8 | 4.6 | 5.2 | 5.1 |
|  | 6 | 5.7 | 5.4 | 4.9 | 4.8 | 5.1 | 4.5 | 4.7 | 4.6 | 4.7 | 4.5 |
|  | 7 | 5.5 | 5.4 | 4.8 | 4.6 | 4.6 | 4.4 | 4.9 | 4.5 | 4.6 | 4.5 |
|  | 8 | 5.2 | 4.8 | 4.8 | 4.5 | 4.6 | 4.6 | 4.9 | 4.9 | 5.1 | 4.9 |
|  | 9 | 5.4 | 5.1 | 5.2 | 5.2 | 4.8 | 4.8 | 4.7 | 4.8 | 4.8 | 4.8 |
|  | 10 | 5.2 | 5.0 | 4.8 | 4.8 | 4.6 | 4.6 | 4.7 | 4.8 | 4.7 | 4.8 |

In these experiments, something is downloaded in the background while doing the experiment.

TABLE 7

Measurements on 3G with a background flow.
MAXIMUM OUTSTANDING REQUESTS PER TCP CONNECTION

|  |  | 1 | 2 | 3 | 4 | 5 | 6 | 7 | 8 | 9 | 10 |
|---|---|---|---|---|---|---|---|---|---|---|---|
| NUMBER OF | 1 | 42.4 | 38.1 | 27.6 | 24.2 | 18.8 | 20.7 | 18.8 | 18.4 | 17.0 | 16.0 |
| PARALLEL TCP | 2 | 17.4 | 14.4 | 13.1 | 12.3 | 12.5 | 11.2 | 9.6 | 12.9 | 11.8 | 15.4 |
| CONNECTIONS | 3 | 22.2 | 16.8 | 12.9 | 9.2 | 9.2 | 9.4 | 8.7 | 9.2 | 8.6 | 8.5 |
|  | 4 | 14.1 | 13.7 | 12.5 | 12.6 | 12.4 | 11.1 | 11.3 | 10.3 | 9.5 | 9.7 |
|  | 5 | 14.6 | 11.9 | 12.7 | 11.3 | 11.1 | 10.0 | 9.2 | 9.8 | 8.6 | 8.7 |
|  | 6 | 13.3 | 12.6 | 9.3 | 9.5 | 9.1 | 9.3 | 8.7 | 8.7 | 8.4 | 8.2 |
|  | 7 | 11.3 | 11.8 | 9.4 | 8.4 | 9.1 | 8.4 | 8.7 | 9.3 | 8.8 | 8.1 |
|  | 8 | 11.5 | 9.1 | 8.5 | 8.0 | 7.8 | 8.5 | 7.9 | 7.8 | 8.8 | 8.2 |
|  | 9 | 11.1 | 10.5 | 8.2 | 8.2 | 7.0 | 7.8 | 7.7 | 7.4 | 7.8 | 7.8 |
|  | 10 | 9.1 | 9.6 | 7.7 | 7.6 | 7.9 | 7.6 | 7.6 | 7.6 | 7.4 | 8.1 |

Figure 6:
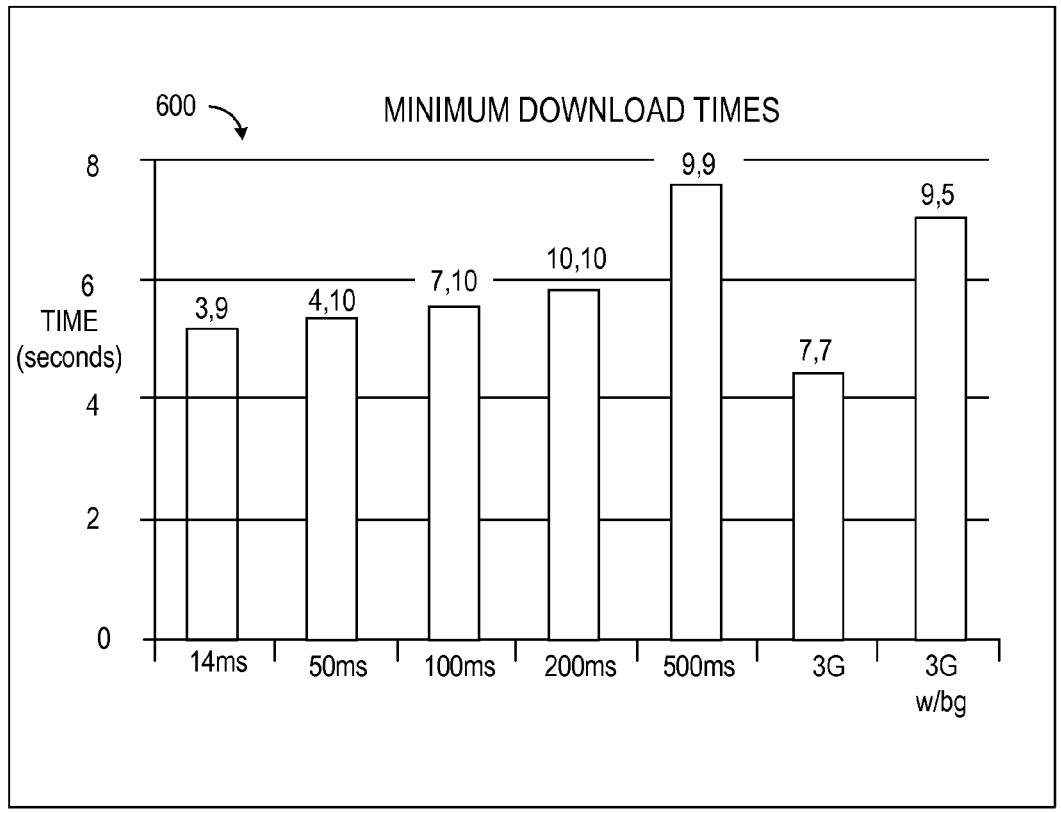
FIG. 6 illustrates a graphical plot for best page download time achieved for different RTTs with a fixed bandwidth.

By way of summary, FIG. 6 presents the best page download time that was achieved for different RTTs with a fixed bandwidth of 1.5 MBit/s, and also over a 3G connection and a 3G connection with background traffic (which both had higher bandwidth than 1.5 Mbit/s). The annotations for each case give the number of parallel connections and amount of pipelining at which the best result was achieved.

Note that for clarity that these experiments were restricted to 90% of the page objects which resided on a single server, although aspects of the present innovation can be extended to multiple server results.

It should be appreciated with the benefit of the present disclosure from FIG. 6 that in principle the download time need not be nearly as sensitive to the RTT as in FIG. 3.

HTTP Optimization, Multi-Homing, Mobility and Priority:

The present innovation addresses the question of optimal construction and scheduling of requests and connections in an HTTP stack, improving page load time and also providing for greater responsiveness to changes in object priorities, for example when a web page is scrolled so that a partially downloaded image is no longer visible.

The present innovation also considers solutions to multi-homing and mobility at the application layer for HTTP. Multi-homing provides for simultaneous use of multiple interfaces, for example WWAN and WLAN interfaces which improves download time, especially in the case that the available bandwidth the interfaces is of the same order of magnitude (this is often the case because WLAN is backhaul-limited). Mobility provides for switching connections as the device moves. In combination they provide for smoother mobility. Mobility can be provided this way without server or network support, in contrast to transport or network layer solutions such as Multi-Path Transport Control Protocol (MPTCP) or MobileIP that require server or network support respectively.

The techniques described here for the support of multi-homing and mobility, as well as the use of multiple partial requests to improve responsiveness to changes in priority and improve multi-homing and mobility support are believed to be novel. The technique of maintaining separate Domain Name Service (DNS) cache for each interface is also believed to be novel.

Finally, we also describe a novel technique for implementing some of the techniques described here in the absence of operating system and web browser support though the use of network proxies, statically defined routes and Proxy Auto Configuration (PAC) scripts.

The general problem can be described as follows:

An HTTP stack is provided by the application (for example a web browser) with a set of required resources in the form of a set of Uniform Resource Locators (URLs). These may be provided at one time, or over a period of time. The HTTP stack has several decisions to make in terms of when and how to issue requests for these resources. Specifically:

If multiple resources are available at the same server, these requests may be pipelined onto a single TCP connection.

If this is done, the order of the requests needs to be decided.

Support for pipelining is not universal or consistent and so it may be desirable to limit the number of outstanding requests, or detect somehow server support for pipelining.

A server may support QC HTTP extensions for out-of-order responses in which case there are different criteria for the ordering of requests and the number of outstanding requests.

There may be a bound on the number of parallel TCP connections which should be open at any one time, and this results in needing to choose an order for establishment of connections to different servers.

The basic problem is therefore to schedule both TCP connections and HTTP requests on those connections in such a way that link utilization is maximized. Call this Problem 1.

Note that the problem is described herein in terms of resources that are available at certain servers. These servers may be the original web server hosting the content (origin server) or a (non-transparent) proxy server on the path between client and origin server. A proxy server may be specific to a particular resource or resources (in the case of CDN proxies) or may be applicable for any resource (in the case of a configured or learned local proxy). The problems and algorithms described here are independent of what kind of "server" the client accesses to retrieve the resources: we assume that any optional server capability may be present on any kind of server.

A number of enhancements to this problem can be implemented as follows:

It is common that there is some kind of priority ordering on the required resources. For example for a web server it is generally desirable to receive layout, style, script and text resources before images, ads and videos and before invoking trackers or other ancillary functions. This allows page rendering to begin before all the resources are downloaded. So an enhanced problem is Problem 1 plus the additional information of a priority ordering on the resources and the additional goal of delivering resources in or close to that order. Call this Problem 2.

Another possibility is that the priority ordering of resources may change before all resources are completely received (also remembering that Problem 1 included the possibility that new resources could be added to the required list during the download process). For example this may occur if a user scrolls a web page before it is completely downloaded and so the ordering of resources changes to prioritize those that are visible. In this case an additional goal is to respect this change or priority and ensure the available resources remain dedicated to the highest priority resources after the change. Call this Problem 3.

Another case is that in which the client has access to multiple interfaces and therefore multiple paths to servers hosting the resources. It should be important to consider here that the DNS resolution of Domain Names may vary by interface due to the common operation of CDNs—something which is believed to not be supported in existing systems. In this case the problem is enhanced with the additional objective of making use of the available bandwidth on all of the multiple interfaces. Call this Problem 4.

Finally, it is possible that the set of available interfaces may change. In this case, the change is required to be handled efficiently with minimum data loss and maintaining the principle that available bandwidth should be dedicated to the highest priority resources. Call this Problem 5.

In summary, Problem 1 concerns optimal use of pipelining and request scheduling for a set of URLs. The object is to optimize bandwidth usage and so reduce page download time.

Problem 2 adds a priority ordering to the URLs and a goal to respect that priority. The object is to enable progressive rendering of web pages and so improve perceived page download speed.

Problem 3 allows that the priorities can change. The object is to ensure bandwidth is quickly re-assigned to the high priority objects and so improve responsiveness to user changes of focus (clicking links, changing tab, scrolling etc.).

Problem 4 considers efficient use of multiple interfaces and so aims to improve page download time through link aggregation for multi-homed hosts.

Problem 5 considers changes in the available interfaces and so aims to support mobility.

A solution to these problems based on the HTTP protocol is herein focused on the HTTP application layer, instead of the transport layer.

Existing Solutions: Existing web browsers attempt to solve Problem 1 and, to some extent, Problem 2. However, current implementations have several deficiencies. First, the resources (URLs) required are identified progressively as the page is downloaded, meaning that decisions are made about opening and closing connections without taking into account information about future required resources which are already known by the client.

Secondly, existing browsers commonly have an arbitrary restriction on the number of parallel connections. It is not expected that large numbers of parallel connections provide an advantage. A common rule-of-thumb seems to be that there are diminishing returns above six (6) parallel connections. It should be noted, though, that often WWAN networks are configured with large network-side downlink buffers. This can contribute to high RTTs when the link is being fully utilized. TCP Slow Start for parallel connections may therefore be quite slow if another connection is already utilizing the link.

Thirdly, existing browsers do not always make good use of pipelining. This is because pipelining is not consistently supported in HTTP proxies. Also, use of pipelining with a proxy can cause a "blocking" problem where the TCP connection becomes idle because the next object to be sent is not yet available at the proxy. If another object requested on the same connection is available at the proxy then it would be desirable to send that instead as an "out of order response".

The recently announced SPDY project at Google (http://dev.chromium.org/spdy) aims to solve Problems 1 and 2 by inserting a thin multiplexing layer between TCP and HTTP. This allows multiple HTTP transactions to take place in parallel with assigned priorities over a single TCP connection. The authors identify Problem 3 as future work. The SPDY project also identifies HTTP header compression as an important component. Although WWAN is not mentioned specifically, HTTP Request compression in particular could be valuable for WWAN networks.

The present disclosure analyzes exemplary approaches that progressively address problems 1-5 based on standard HTTP 1.1. In addition, some minimal, optional, server enhancements are described that could further improve performance.

Problem 1: Basic connection and request scheduling: The basic idea of this section is to treat identification of resources, establishment of TCP connections and scheduling the actual requests separately. First an assumption is made that the required resources are identified and thus the complete set of servers are known that need to be contacted. Second, TCP connections are established to these servers, although not necessarily all at once and not necessarily one connection per server. Third, requests are mapped to the established connections.

There are two principles which should determine opening of connections:

First, minimize the number of connections to each server, and consequently make use of pipelining. This is because a high price is paid each time a new connection is established (SYN/ACK and slow-start). This is especially true if other active connections mean there is a large queuing delay and hence large RTT.

Second, make use of multiple parallel connections to reduce the overall congestion response when a packet is lost or late. If there are 'n' TCP connections then the response to a single loss is to reduce the combined congestion window by $1/2n$.

These two objectives are obviously in conflict, so parameters are introduced that control this trade-off: Let $P_{max}$ be the maximum number of parallel TCP connections and let $P_{min}$ be a target on the minimum number of parallel TCP connections. The aim is to establish one (1) connection per server, subject to $P_{min}$.

Given a set U of n URLs, $U=\{U_0, \ldots, U_{n-1}\}$ from which a set S of m unique servers $S=\{S_0, \ldots, S_{m-1}\}$ can be identified where m≤n. Note that an immediately useful enhancement to existing web servers would be to identify as quickly as possible as many required URLs as possible for a page. Presently this process is intertwined with the download and rendering process which it need not be.

Servers, $S_j$, are identified by IP address rather than Fully Qualified Domain Name (FQDN), since multiple FQDNs may map to the same IP address. (The possibility of a single FQDN mapping to multiple addresses is described further below.) Let s(i) be the index of the server required for URL U, (i.e., $U_i$ can be obtained from $S_{s(i)}$ and let U(j) be the set of URLs that can be obtained from server $S_j$.

A process is provided for establishing connections and allocating requests to connections. In this process, a request opportunity is an opportunity to issue a new request. How this is defined is a trade-off between committing in advance to request/connection matches and allowing connections to become idle because all requests complete before a new one is issued. Some examples are given below.

Algorithm 1:

1) For k = 0 to m−1, let $u_k := U(k)$
2) If (number of open connections) < $P_{max}$
   a. if (∃ i such that $u_i \neq \emptyset$ and there is no open connection to $S_i$)
      i. Open a new connection to $S_i$
   b. else if (∃ i such that $u_i \neq \emptyset$)
      i. if (number of open connections) < $P_{min}$
         1. Open a new connection to $S_i$
   c. else STOP
3) Wait for a request opportunity or for a connection to close
4) If there is a request opportunity
   a. Let C be the connection with a request opportunity and let i be the index of the server $S_i$ to which C connects.
   b. If $u_i = \emptyset$
      i. Schedule C to close after the currently issued requests have completed.
   c. else
      i. Choose an element $u \in u_i$.
      ii. Issue a request for u on C.
      iii. Let $u_i := u_i - \{u\}$
5) Go to (2)

The operation of this process depends on how request opportunity is defined. Two extremes are defined as follows:

Greedy request opportunity: This occurs whenever a connection to a server is open.

Lazy request opportunity: This occurs whenever a response is completely received on a connection.

In the case of Greedy request opportunities, all requests are issued immediately, subject to the maximum number of connections, $P_{max}$. Requests may also be distributed across multiple connections to the same server, in order to respect $P_{min}$. However, once all requests are issued, there is no opportunity to make changes. It may occur that there are fewer than $P_{min}$ connections because requests on one connection take much longer to complete than those on another.

In the case of Lazy request opportunities, $P_{min}$ is respected throughout the process. However each connection is left idle for the time between the end of one response and the beginning of the next, which measures one round trip time plus the server response time. This is the standard behavior for HTTP1.1 clients which do not support pipelining.

Ideally, a definition for request opportunities would lie somewhere between the two extremes. For example the request opportunity could occur when the remaining time to receive a response is estimated to be one round trip time plus the server processing time. However the server processing time is not known, the RTT is only estimated and anyway this time may be longer than the total reception time for the previous response. In the description below, "Just-in-Time" (JiT) request opportunities means an optimized version where the request is issued in sufficient time to avoid the link becoming idle, but otherwise as late as possible.

Server support of pipelining: It is rumored that proxy servers do not provide consistent support for pipelining. HTTP 1.1 servers (including proxies) are required to either process or ignore pipelined requests (i.e., not to fail). Thus if more than one request has been issued, it should be possible after the first response has been completely received to determine whether the server supports pipelining (by whether the second response follows or not). In the case that a server does not support pipelining, the URLs that have been requested from that server, except the first, should be returned to the $u_i$ set for the server and the absence of pipelining support noted. Subsequent connections to that server should receive a maximum of one request.

Out-of-order responses: Standard servers return the responses to pipelined requests in the order the requests were received. An HTTP extension is defined that allows servers to return requests in a different order. This is of value since, especially in the case of a proxy server, objects may become available at the server in a different order from that in which they were requested. In-order object delivery may therefore cause a head-of-line blocking problem. To make use of this feature, though, multiple requests need to be pipelined onto the connection: if more requests are queued then the chance of head-of-line blocking is reduced but a greater commitment has been made: as a result, when this feature is present it can be desirable to issue more requests on a connection than when it is not.

The out-of-order extension consists of a "TransactionID" header field added to requests. Out-of-order responses echo the TransactionID value of the corresponding request. The absence of the TransactionID field in a response indicates that the server does not support out-of-order responses.

HTTP Header Compression: HTTP Supports gzip compression of entity bodies but not of requests. The Google SPDY project identifies HTTP header compression as providing a significant advantage and for WWAN networks it might be expected that request compression would be especially useful.

Header compression could easily be defined as a backwards compatible HTTP extension as follows:

Clients supporting header compression indicate this with a new optional header in the first request, similar to the existing Content-Encoding header (e.g. Header-Encoding: gzip)

Servers supporting header compression recognize the new header and return responses with compressed headers The start of header compression could be indicated by the standard gzip header appearing in the stream where a new request or response is expected.

The sequence of requests or responses on a connection should be compressed as one continuous stream. The uncompressed stream is formed from the concatenation of the requests or responses (including the terminating newline of each). There must be a flush point at the end of each request or response, so this can be decoded fully without reception of subsequent information.

Uncompressed requests or responses sent before compression was started should be used as a static dictionary for compression.

Server identified resources: Google SPDY identifies the possibility for the server to return resources to the client that the client has not requested in those instances that the server is aware that this resource will be required. There is also the possibility for the server to provide suggestions of resources that the client may wish to request.

The former option requires the ability for the client to cancel a request, whereas the latter achieves most of the same objective without the need for that capability.

A simple implementation of the suggested approach, if out-of-order responses is supported, is for the server to send the response header for a server-identified resource, with a special Transaction ID and the request URL. This allows cache-related information (Date, ETags, cache-control directives) to be included so that the client can consult its cache and determine whether to request the object.

Cancelling requests: If the out-of-order extension described in above is supported, then a new method to cancel a request can be trivially added by referring to the request with the Transaction ID. This may be useful to allow more requests to be queued up in the pipeline (and so reduce the chance of head-of-line blocking) while still being able to reverse this commitment if necessary.

Problem 2: Request prioritization: Problem 2 introduces the added possibility that the set of URLs, U, has a priority order. Without loss of generality, it is assumed that the list $U_0, \ldots, U_{n-1}$ is in priority order with highest priority first. Also added is the objective that higher priority objects are delivered before lower priority ones.

Note that this new objective is secondary to the original objective of maximizing available bandwidth usage: i.e. it is acceptable to deliver objects out of priority order if this is necessary to maximize bandwidth usage (otherwise, the requirement would be met by issuing requests in strict priority order, waiting after each request for it to complete before issuing another one).

To support prioritization Algorithm 1 is modified as follows:

Algorithm 2

1) The ordering on U induces an ordering on S by placing the servers in order of the highest priority resource available on that server. Then each set $u_i$ is also ordered in the obvious way.

2) Following Algorithm 1, except that in Steps 2 (a), 2 (b) and 4 (c) (i) the value of i chosen shall be the least such value.

Problem 3: Changes in priority: The Google SPDY protocol aims to address this requirement by providing a thin multiplexing layer between TCP and HTTP and using this to multiplex multiple requests/response transactions onto the same connection. The difference from existing techniques can be seen as follows:

Pipelining allows multiple request/response transactions to share a TCP connection, but requires the responses to be returned sequentially and in order.

Pipelining with out-of-order response (One-shot-web) allows responses to be returned in a different order, but they are still sequential (each response must be completed before the next begins).

Parallel TCP connections allow responses to be sent in parallel (multiplexed at the IP layer), but the transactions proceed independently: there is no way to coordinate prioritization of one over the other.

So, the SPDY protocol aims to obtain the benefits of pipelining, without the requirement for sequential completion of response.

Firstly, it should be noted that in Algorithm 2, if Lazy or Just-in-time Request Opportunities are used, then it is always possible at any time to re-order the priority of unrequested resources within each $u_i$ set. This simple approach may provide substantial benefits (call this Algorithm 2a).

An alternative scheme is now described to handle priority changes at a finer granularity based on the use of HTTP partial requests (i.e., HTTP requests with Range headers).

First, let R be a maximum request size, in bytes. Requests are issued for pieces of the required resources of size R or less. In Algorithm 2, each URL, is replaced by a pair (URL, Byte Range). These pairs are initialized with the URLs provided by the application and the Byte Range [0,R-1].

Then add the following procedure is added to form Algorithm 3:

On receipt of the first response header for a URL, obtain the object size F. Then, if F>R, construct r:=ceil(F/R)-1 additional entries in $u_i$ with the same URL and Byte Ranges [R, 2R-1], [2R, 3R-1], [rR, F-1]. Note that the order of entries in $u_i$ should be based on the priority ordering of the URLs as before.

In this scheme, when a change of priority occurs, the amount of outstanding data which has been requested and not received on a connection is at most R and therefore the period for which resources are dedicated to lower priority resources is reduced.

In order to efficiently support Just-In-Time (JiT) Request Opportunities, it is likely that R should be larger than the amount of data that can be transmitted in one Round Trip Time. It may be that R should be varied according to measured round trip times and data rates.

Problem 4: Support for multi-homing: A multi-homed host is one that has multiple connected interfaces and therefore multiple routes to the Internet. The objective in the case of a multi-homed host is to make simultaneous use of the multiple interfaces to improve download speeds.

First, it is assumed that the HTTP stack has knowledge of the available interfaces and the ability to direct a TCP connection to use a particular interface. This is not the case in existing host Operating System (OS) implementations and so some work is required to achieve this. In advance of such OS improvements, a possible alternative is to provide HTTP proxy servers, reachable over the separate interfaces and define explicit routes for those servers within the client routing table that direct packets for each server over a different interface. In this way, selecting a proxy server determines the interface that will be used and connections can be directed to an interface by directing them to the proxy associated with that interface.

Selection of a proxy server can be controlled in many existing Web Browser implementations through the use of Proxy Autoconfiguration Scripts, which allow the user to specify a JavaScript function which determines the proxy to be used for a given URL. This approach allows requests to be statically distributed across interfaces, for example a certain percentage of requests to one interface and the remainder to another.

A suitable script is shown below which directs 1/N of the requests to proxy_a and the remainder to proxy_b:

```
var N = 2;
function FindProxyForURL(url, host)
{
    var i = url.length % N;
    if (i == 0)
        return "PROXY proxy_a:8080; "
    else if (i == 1)
        return "PROXY proxy_b:8080; "
}
```

In this script the length of the URL is used as a hash function. Alternative hash functions could also be used.

Given an OS-based capability to direct TCP connections to specific interfaces, a simple multi-homing approach, which is referred herein as Algorithm 4, is to follow Algorithm 2 and to distribute TCP connections across the available interfaces in round-robin fashion.

The same enhancement can be made to Algorithm 3 to obtain Algorithm 5. Compared with Algorithm 4 the advantage is that a large object may be split across the multiple interfaces because partial requests for the object will be distributed across connections.

It is desirable in these cases to set $P_{min}$ to at least the number of interfaces.

Multi-homing and DNS: Due to the normal operation of CDNs, the result of a DNS resolution may be different depending on the point of attachment to the Internet of the host and on the DNS server to which the request is first sent. Existing host OSs do not to our knowledge account for this.

In the particular case of HTTP and CDNs, the reason for the different resolution results is that the CDN identifies a suitable proxy "close" to the point of attachment. It is highly desirable to use the correct proxy for each interface.

Problem 5: Mobility: Given a solution to Problem 4 (multi-homing) then support for mobility is reduced to the problem of handling the cases where an interface shuts down during a transfer and the case where a new interface becomes available.

Algorithm 4 is enhanced to obtain Algorithm 6, supporting mobility, as follows:

When an interface goes down, identify the open connections using that interface and construct a list of incomplete requests that have been issued on those connections. Add these resources back to the appropriate $u_i$ sets and continue the process.

When an interface comes up, make this interface available for selection next time a connection must be established.

In both cases, if $P_{min}$ is set based on the number of interfaces, consider modifying $P_{min}$.

Similar enhancements can be made to Algorithm 5 to obtain Algorithm 7 as follows:

When an interface goes down, identify the open connections using that interface and construct a list of incomplete requests that have been issued on those connections. Add these requests back to the appropriate $u_i$ sets and continue the process. For any requests for a byte range [a, b] in progress, identify the last byte received, c, and add a request for byte range [c+1,b] to the appropriate $u_i$ set.

When an interface comes up, make this interface available for selection next time a connection must be established.

In both cases, if $P_{min}$ is set based on the number of interfaces, consider modifying $P_{min}$.

Figure 7:
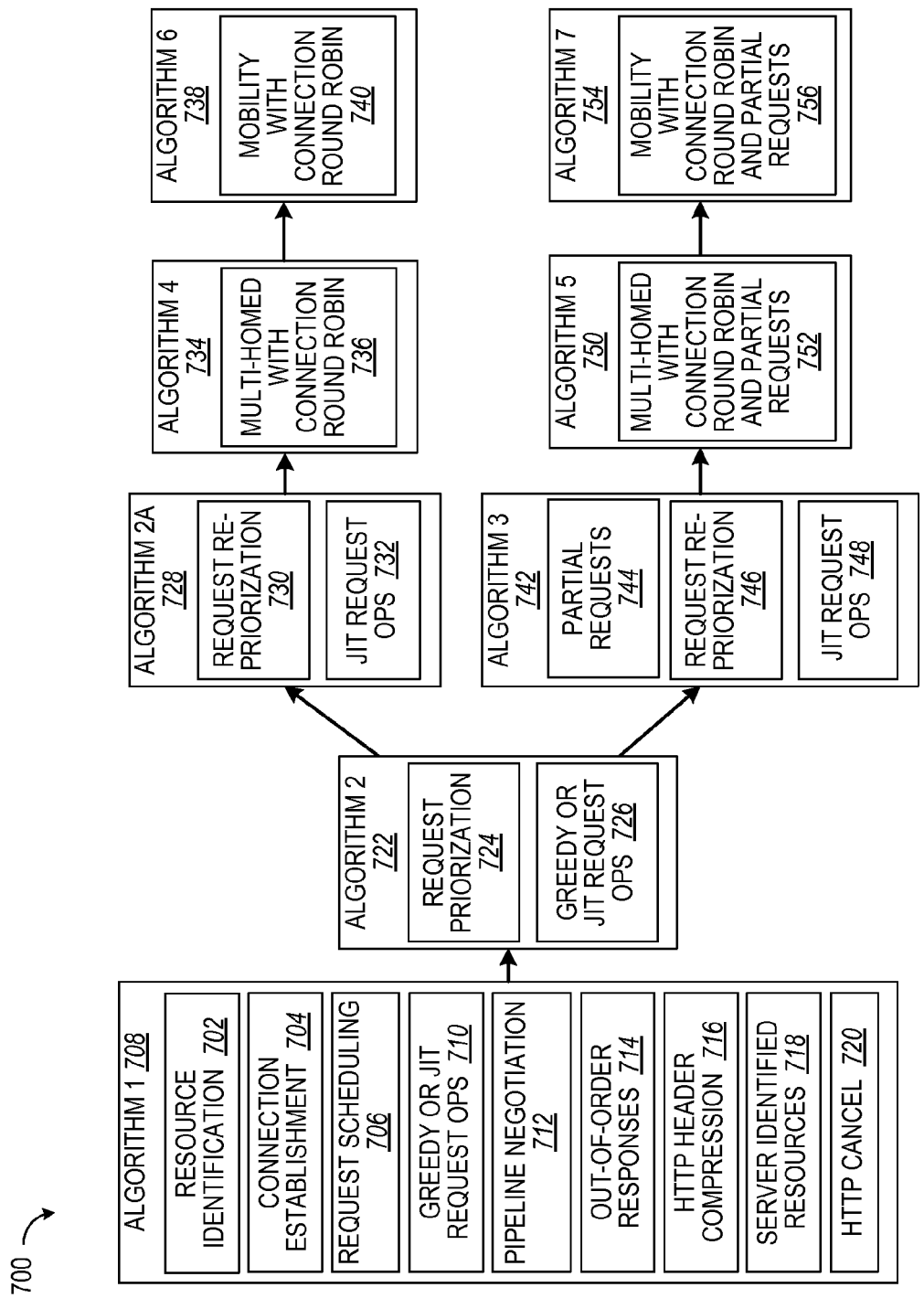
FIG. 7 illustrates a diagram for exemplary relationships of a plurality of algorithms for HTTP optimization.

FIG. 7, a diagram 700 depicts an exemplary relationship of the aforementioned seven (7) algorithms. With the benefit of the present disclosure, it should be appreciated that the basic concepts of separation of resource identification 702, connection establishment 704 and request scheduling 706 are applied from the start in Algorithm 1 708, which can employ Greedy or JIT request operations 710. Algorithm 1 708 can make best use of whatever optional server capabilities are available (e.g., pipelining 712, out-of-order responses 714, header compression 716, server identified resources 718, and HTTP cancel capability 720), but still offering improvements if these are not all available.

Algorithm 2 722 adds simple request prioritization 724 in addition to greedy or JiT request operations 726. In an Algorithm 2a 728 based upon Algorithm 2 722, re-prioritization 730 is provided for use with Just-In-Time Request Opportunities 732. An Algorithm 4 734 that can be based upon Algorithm 2A 728 provides for multi-homing 736 by allocating connections to interfaces on a round-robin basis. An Algorithm 6 738 that is based upon Algorithm 4 734 provides for mobility 740 that can be supported even with this simple model by allocating connections to interfaces on a round-robin basis.

Algorithm 3 742 provides finer granularity re-prioritization by the use of partial requests 744 with request re-prioritization 746 and JiT request operations 748. This approach also offers benefits when extended in Algorithm 5 750 to multi-homing 752 and in Algorithm 7 754 when extended to mobility 756.

Figure 8:
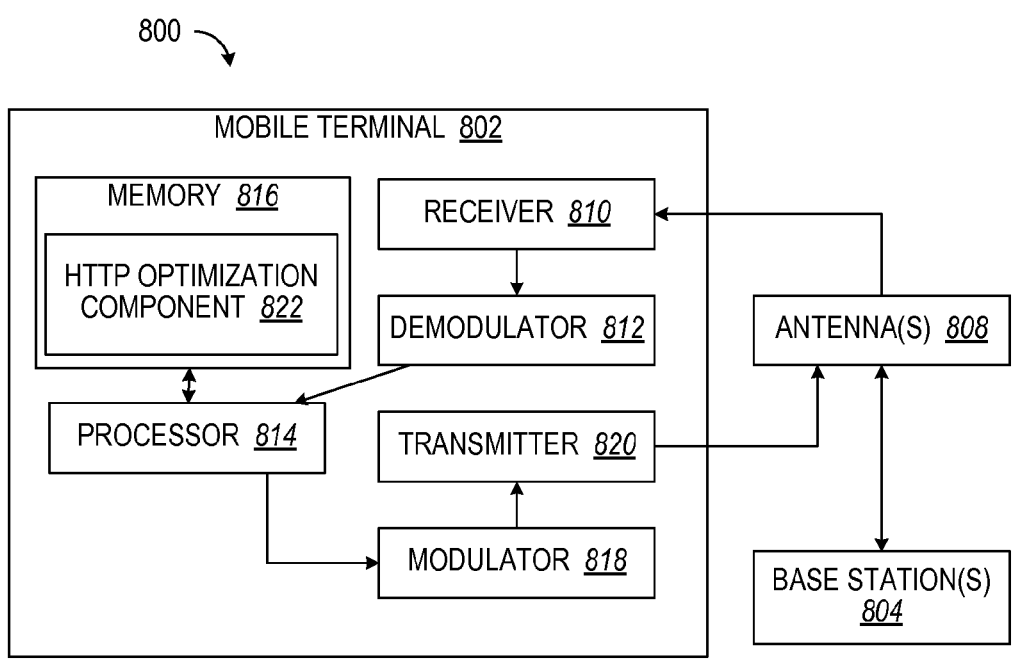
FIG. 8 illustrates a block diagram for a mobile terminal that performs HTTP optimization.

FIG. 8 is a block diagram of another system 800 that can be utilized to implement various aspects of the functionality described herein. In one example, system 800 includes a mobile terminal 802. As illustrated, mobile terminal 802 can receive signal(s) from one or more base stations 804 and transmit to the one or more base stations 804 via one or more antennas 808. Additionally, mobile terminal 802 can comprise a receiver 810 that receives information from antenna(s) 808. In one example, receiver 810 can be operatively associated with a demodulator 812 that demodulates received information. Demodulated symbols can then be analyzed by a processor 814. Processor 814 can be coupled to memory 816, which can store data and/or program codes related to mobile terminal 802. Additionally, mobile terminal 802 can employ processor 814 to perform methodologies described herein. Mobile terminal 802 can also include a modulator 818 that can multiplex a signal for transmission by a transmitter 820 through antenna(s) 808.

The mobile terminal 802 further transmits to the base stations 804 a plurality of pipelined requests via the number of parallel connections for retrieving a hypertext object comprised of packet data portions respectively stored on a plurality of servers. In the memory 816 and executed by the processor 814, an HTTP optimization component 822 dynamically varies the number of parallel connections and pipelined requests via the parallel connections to reduce outstanding requests while maintaining full link utilization.

Figure 9:
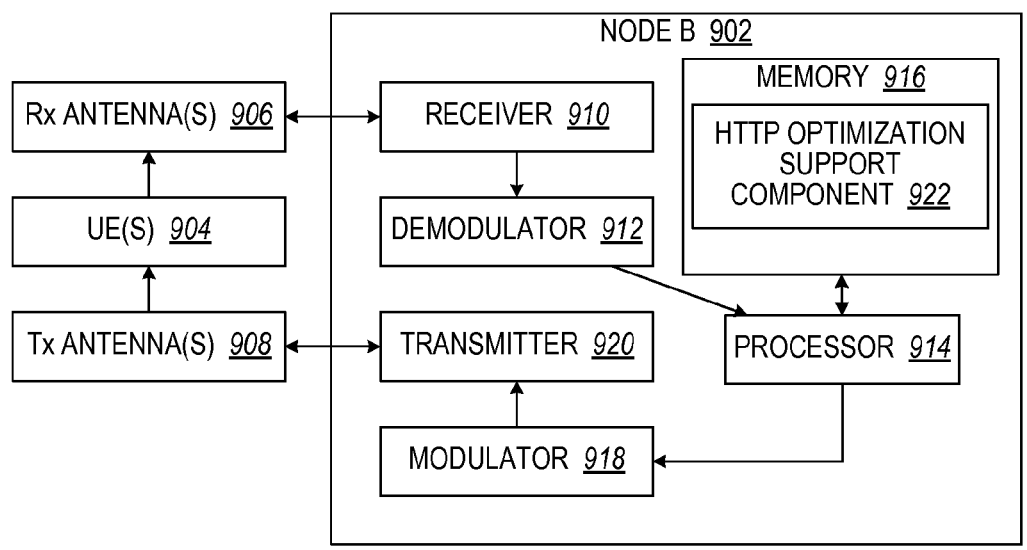
FIG. 9 illustrates a block diagram for a node that supports HTTP optimization.

FIG. 9 is a block diagram of a system 900 that can be utilized to implement various aspects of the functionality described herein. In one example, system 900 includes a base station or Node B 902. As illustrated, Node B 902 can receive signal(s) from one or more UEs 904 via one or more receive (Rx) antennas 906 and transmit to the one or more UEs 904 via one or more transmit (Tx) antennas 908. Additionally, Node B 902 can comprise a receiver 910 that receives information from receive antenna(s) 906. In one example, the receiver 910 can be operatively associated with a demodulator 912 that demodulates received information. Demodulated symbols can then be analyzed by a processor 914. Processor 914 can be coupled to memory 916, which can store information related to code clusters, access terminal assignments, lookup tables related thereto, unique scrambling sequences, and/or other suitable types of information. In one example, Node B 902 can also include a modulator 918 that can multiplex a signal for transmission by a transmitter 920 through transmit antenna(s) 908.

In the memory 916 and executed by the processor 914, an HTTP optimization support component 922 provides capabilities (e.g., pipelining, out-of-order responses, header compression, server identified resources, and HTTP cancel capability) that can be requested by UE 904 to optimize HTTP communications.

Figure 10:
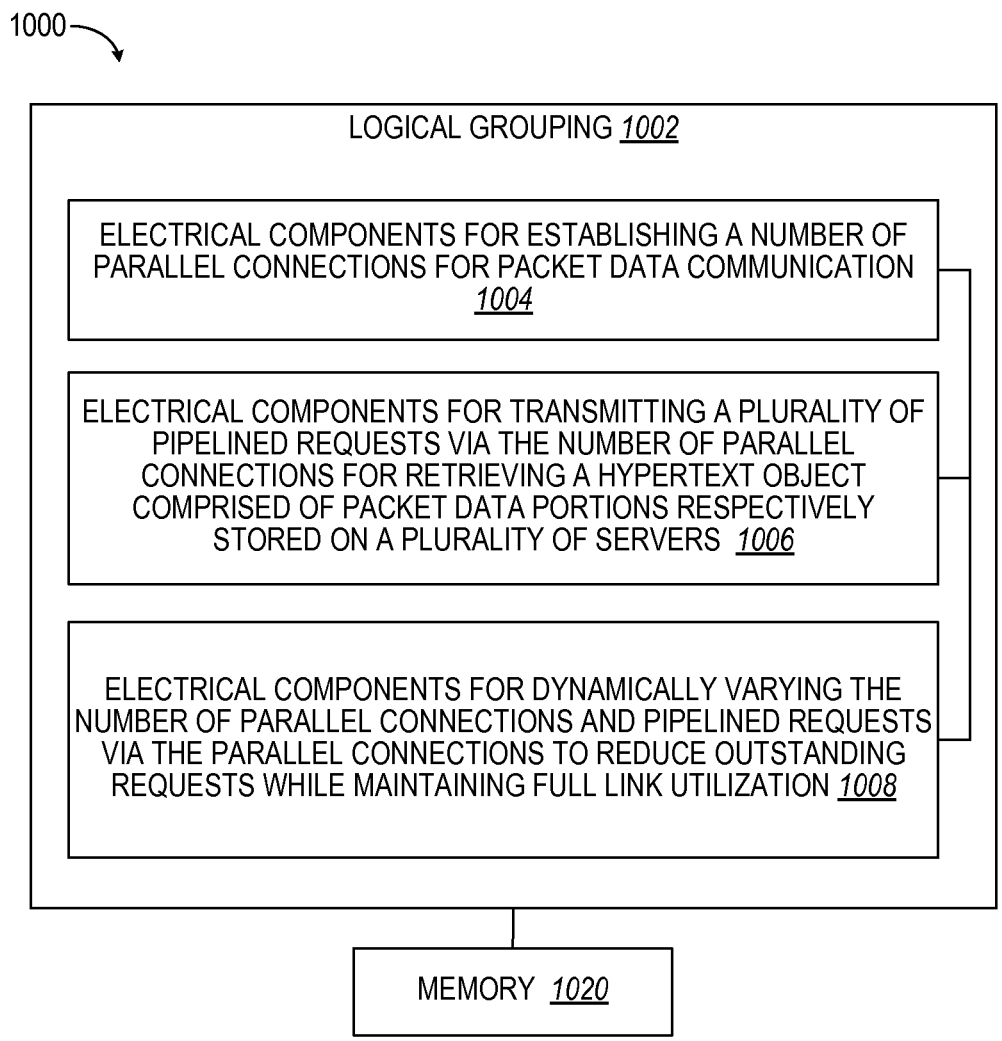
FIG. 10 illustrates a block diagram for a system residing at least in part in a mobile device having logical grouping of electrical components for HTTP optimization.

With reference to FIG. 10, illustrated is a system 1000 for packet data communications. For example, system 1000 can reside at least partially within user equipment (UE). It is to be appreciated that system 1000 is represented as including functional blocks, which can be functional blocks that represent functions implemented by a computing platform, processor, software, or combination thereof (e.g., firmware). System 1000 includes a logical grouping 1002 of electrical components that can act in conjunction. For instance, logical grouping 1002 can include an electrical component 1004 for establishing a number of parallel connections for packet data communication. Moreover, logical grouping 1002 can include an electrical component 1006 for transmitting a plurality of pipelined requests via the number of parallel connections for retrieving a hypertext object comprised of packet data portions respectively stored on a plurality of servers. In addition, logical grouping 1002 can include an electrical component 1008 for dynamically varying the number of parallel connections and pipelined requests via the parallel connections to reduce outstanding requests while maintaining full link utilization. Additionally, system 1000 can include a memory 1020 that retains instructions for executing functions associated with electrical components 1004-1008. While shown as being external to memory 1020, it is to be understood that one or more of electrical components 1004-1008 can exist within memory 1020.

Figure 11:
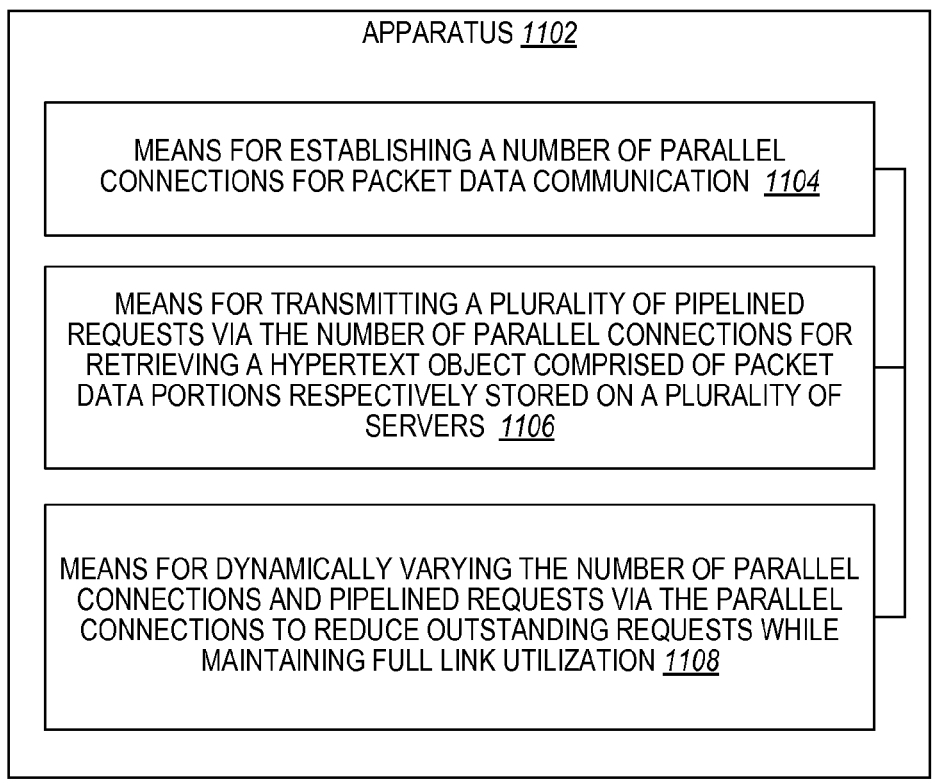
FIG. 11 illustrates a block diagram for a system residing in a network having logical grouping of electrical components for supporting HTTP optimization.

In FIG. 11, an apparatus 1102 is depicted for packet data communication. The apparatus 1102 comprises means 1104 for establishing a number of parallel connections for packet data communication. The apparatus 1102 comprises means 1106 for transmitting a plurality of pipelined requests via the number of parallel connections for retrieving a hypertext object comprised of packet data portions respectively stored on a plurality of servers. The apparatus 1102 comprises means 1108 for dynamically varying the number of parallel connections and pipelined requests via the parallel connections to reduce outstanding requests while maintaining full link utilization.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for packet data communications, the method comprising:
    establishing, by a mobile device, a number of open parallel connections for packet data communication;
    ordering, by the mobile device, a plurality of pipelined requests such that objects for higher priority pipelined requests are delivered before objects for lower priority pipelined requests are delivered;
    transmitting, by the mobile device, the plurality of pipelined requests via the number of open parallel connections for retrieving a hypertext object comprising packet data portions respectively stored on a plurality of servers, wherein delivery of the objects for higher priority pipelined requests is performed to maximize available bandwidth usage of the open parallel connections; and
    maintaining a separate Domain Name Service (DNS) cache for each interface associated with each of the open parallel connections.

2. The method of claim 1, wherein transmitting the plurality of pipelined requests further comprises accessing a node of a wireless wide area network.

3. The method of claim 1, further comprising dynamically varying, by the mobile device, the number of open parallel connections and the plurality of pipelined requests to reduce outstanding requests while maintaining full link utilization.

4. The method of claim 3, wherein maintaining full link utilization further comprises utilizing a greedy request opportunity.

5. The method of claim 3, wherein maintaining full link utilization further comprises utilizing a just-in-time request opportunity.

6. The method of claim 3, wherein dynamically varying the number of parallel connections and pipelined requests further comprises:
    estimating bandwidth and round trip time; and
    transmitting pipelined requests so that a number of requested packet data portions that have not been received does not exceed a product of the estimated bandwidth and round trip time.

7. The method of claim 1, wherein establishing the number of open parallel connections for packet data communication further comprises:
    minimizing a number of connections to each of the plurality of servers;
    using the number of open parallel connections to reduce overall congestion response to late or lost requested packet data; and
    dynamically varying the number of open parallel connections and the number of connections.

8. The method of claim 1, further comprising:
    determining an ordering for rendering the packet data portions; and
    prioritizing an order of the plurality of pipelined requests in relation to the determined ordering.

9. The method of claim 1, wherein transmitting the plurality of pipelined requests further comprises requesting header compression.

10. The method of claim 1, further comprising receiving server identified resources.

11. The method of claim 10, further comprising:
    determining that the server identified resources are not needed; and
    canceling the server identified resources.

12. The method of claim 1, wherein the transmitting the plurality of pipelined requests further comprises transmitting a plurality of partial pipelined requests.

13. The method of claim 1, wherein transmitting the plurality of pipelined requests further comprises:
    detecting that an interface has become unavailable or has become available;
    identifying open connections using the interface;
    constructing a list of incomplete pipelined requests that have been issued on the open connections; and
    dynamically varying the number of open parallel connections and the plurality of pipelined requests with connection round robin based in part upon the identified open connections, the interface, and the list of incomplete pipelined requests.

14. The method of claim 1, wherein when the delivery of the objects for higher priority pipelined requests is out of priority order to maximize the available bandwidth usage of the open parallel connections, the objects for higher priority pipelined requests are delivered in out of priority order.

15. At least one processor for packet data communications, the at least one processor comprising:
    a first module for establishing, by a mobile device, a number of open parallel connections for packet data communication;
    a second module for ordering, by the mobile device, a plurality of pipelined requests such that objects for higher priority pipelined requests are delivered before objects for lower priority pipelined requests are delivered;
    a third module for transmitting, by the mobile device, the plurality of pipelined requests via the number of open parallel connections for retrieving a hypertext object comprising packet data portions respectively stored on a plurality of servers, wherein delivery of the objects for the higher priority pipelined requests is performed to maximize available bandwidth usage of the open parallel connections; and
    a fourth module for maintaining a separate Domain Name Service (DNS) cache for each interface associated with each of the open parallel connections.

16. The at least one processor of claim 15, further comprising a fifth module for dynamically varying, by the mobile device, the number of open parallel connections and the plurality of pipelined requests to reduce outstanding requests while maintaining full link utilization.

17. The at least one processor of claim 15, wherein when the delivery of the objects is out of priority order to maximize the available bandwidth usage of the open parallel connections, the objects for higher priority pipelined requests are delivered in out of priority order.

18. A non-transitory computer-readable medium storing sets of computer executable code comprising:
a first set of codes for causing a computer of a mobile device to establish a number of open parallel connections for packet data communication;
a second set of codes for ordering, by the mobile device, a plurality of pipelined requests such that objects for higher priority pipelined requests are delivered before objects for lower priority pipelined requests are delivered;
a third set of codes for causing the computer to transmit the plurality of pipelined requests via the number of open parallel connections for retrieving a hypertext object comprising packet data portions respectively stored on a plurality of servers, wherein delivery of the objects for the higher priority pipelined requests is performed to maximize available bandwidth usage of the open parallel connections; and
a fourth set of codes for maintaining a separate Domain Name Service (DNS) cache for each interface associated with each of the open parallel connections.

19. The non-transitory computer-readable medium of claim 18, further comprising a fifth set of codes for causing the computer to dynamically vary the number of open parallel connections and the plurality of pipelined requests to reduce outstanding requests while maintaining full link utilization.

20. An apparatus for packet data communications, the apparatus comprising:
means for establishing, by a mobile device, a number of open parallel connections for packet data communication;
means for ordering, by the mobile device, a plurality of pipelined requests such that objects for higher priority pipelined requests are delivered before objects for lower priority pipelined requests are delivered;
means for transmitting, by the mobile device, the plurality of pipelined requests via the number of open parallel connections for retrieving a hypertext object comprising packet data portions respectively stored on a plurality of server, wherein delivery of the objects for the higher priority pipelined requests is performed to maximize available bandwidth usage of the open parallel connections; and
means for maintaining a separate Domain Name Service (DNS) cache for each interface associated with each of the open parallel connections.

21. The apparatus of claim 20, further comprising means for dynamically varying, by the mobile device, the number of open parallel connections and the plurality of pipelined requests to reduce outstanding requests while maintaining full link utilization.

22. An apparatus for packet data communications, the apparatus comprising:
a transceiver for establishing, by a mobile device, a number of open parallel connections for packet data communication;
the transceiver further for ordering, by the mobile device, a plurality of pipelined requests such that objects for higher priority pipelined requests are delivered before objects for lower priority pipelined requests are delivered;
the transceiver further for transmitting, by the mobile device, the plurality of pipelined requests via the number of open parallel connections for retrieving a hypertext object comprised of packet data portions respectively stored on a plurality of servers, wherein delivery of the objects for the higher priority pipelined requests is performed to maximize available bandwidth usage of the open parallel connections; and
a computing platform for maintaining a separate Domain Name Service (DNS) cache for each interface associated with each of the open parallel connections.

23. The apparatus of claim 22, wherein the transceiver is further for transmitting the plurality of pipelined requests by accessing a node of a wireless wide area network.

24. The apparatus of claim 22, wherein the computing platform is further for dynamically varying, by the mobile device, the number of open parallel connections and the plurality of pipelined requests to reduce outstanding requests while maintaining full link utilization.

25. The apparatus of claim 24, wherein the computing platform via the transceiver is further for establishing the number of open parallel connections for packet data communication by:
minimizing a number of connections to each of the plurality of servers;
using the number of open parallel connections to reduce overall congestion response to late or lost requested packet data; and
dynamically varying the number of open parallel connections and the number of connections.

26. The apparatus of claim 24, wherein the computing platform is further for determining an ordering for rendering the packet data portions, and for prioritizing an order of the plurality of pipelined requests in relation to the determined ordering.

27. The apparatus of claim 24, wherein the computing platform is further for maintaining full link utilization by utilizing a greedy request opportunity.

28. The apparatus of claim 24, wherein the computing platform is further for maintaining full link utilization by utilizing a just-in-time request opportunity.

29. The apparatus of claim 24, wherein the computing platform is further for determining that server identified resources received by the transceiver are not needed, and for canceling the server identified resources.

30. The apparatus of claim 24, wherein the computing platform is further for
detecting that an interface has become unavailable or has become available;
identifying open connections using the interface;
constructing a list of incomplete pipelined requests that have been issued on the open connections; and
dynamically varying the number of open parallel connections and the plurality of pipelined requests with connection round robin based in part upon the identified open connections, the interface, and the list of incomplete pipelined requests.

31. The apparatus of claim 24, wherein the computing platform is further for dynamically varying the number of open parallel connections and the plurality of pipelined requests by:
estimating bandwidth and round trip time; and
transmitting pipelined requests so that a number of requested packet data portions that have not been received does not exceed a product of the estimated bandwidth and round trip time.

32. The apparatus of claim 22, wherein the transceiver is further for transmitting the plurality of pipelined requests by requesting header compression.

33. The apparatus of claim 22, wherein the transceiver is further for receiving server identified resources.

34. The apparatus of claim 22, wherein the transceiver is further for transmitting the plurality of pipelined requests by transmitting a plurality of partial pipelined requests.

* * * * *